United States Patent
Wang et al.

(10) Patent No.: US 11,770,343 B2
(45) Date of Patent: Sep. 26, 2023

(54) USAGE OF A HELPING USER EQUIPMENT DURING SIDELINK RETRANSMISSION

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US); Lik Hang Silas Fong, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 16/844,823

(22) Filed: Apr. 9, 2020

(65) Prior Publication Data
US 2021/0320879 A1    Oct. 14, 2021

(51) Int. Cl.
*H04L 47/32* (2022.01)
*H04L 47/2425* (2022.01)
*H04W 72/04* (2023.01)

(52) U.S. Cl.
CPC .......... *H04L 47/32* (2013.01); *H04L 47/2433* (2013.01); *H04W 72/04* (2013.01)

(58) Field of Classification Search
CPC . H04L 47/2458; H04L 47/32; H04L 47/2433; H04W 28/0247; H04W 28/0289; H04W 28/0284; H04W 72/04
See application file for complete search history.

(56) References Cited

U.S. PATENT DOCUMENTS

| | | |
|---|---|---|
| 2010/0309788 A1 | 12/2010 | Ho et al. |
| 2019/0280819 A1* | 9/2019 | Määttanen ............ H04L 1/1887 |
| 2020/0107178 A1 | 4/2020 | Chae |
| 2020/0228248 A1* | 7/2020 | Islam ..................... H04L 1/1861 |
| 2020/0245311 A1 | 7/2020 | Uchiyama et al. |
| 2021/0185559 A1* | 6/2021 | Lee ..................... H04W 28/0247 |
| 2022/0078802 A1* | 3/2022 | Zhao ..................... H04L 1/1812 |
| 2022/0167312 A1* | 5/2022 | Lee ..................... H04W 72/542 |
| 2022/0345251 A1* | 10/2022 | Lee ........................ H04L 5/0055 |

FOREIGN PATENT DOCUMENTS

| | | |
|---|---|---|
| WO | 2018062832 A1 | 4/2018 |
| WO | 2019031085 A1 | 2/2019 |

OTHER PUBLICATIONS

WO 2019/156528 A1 (Year: 2019).*
WO 2020/233187 A1 (Year: 2020).*
U.S. Appl. No. 62/938,933 (Year: 2019).*
International Search Report and Written Opinion—PCT/US2021/024961—ISAEPO—dated Jul. 16, 2021.

* cited by examiner

*Primary Examiner* — Ian N Moore
*Assistant Examiner* — Rushil P. Sampat
(74) *Attorney, Agent, or Firm* — Procopio, Cory, Hargreaves & Savitch LLP

(57) ABSTRACT

Apparatus, methods, and computer-readable media for facilitating usage of memory of helping UEs during sidelink retransmission are disclosed herein. An example method for wireless communication at a first user equipment (UE) includes receiving, from a wireless device, a first packet and a second packet for sidelink retransmission to at least one second UE, the second packet being received after the first packet. The example method also includes dropping the first packet or the second packet prior to retransmission based on at least one of a packet priority or an indication from the wireless device.

26 Claims, 15 Drawing Sheets

USAGE OF A HELPING USER EQUIPMENT DURING SIDELINK RETRANSMISSION

BACKGROUND

Technical Field

The present disclosure relates generally to communication systems, and more particularly, to wireless communication including sidelink retransmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in 5G NR technology, including V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). An example apparatus receives, from a wireless device, a first packet and a second packet for sidelink retransmission to at least one second UE, the second packet being received after the first packet. Then, the apparatus drops the first packet or the second packet prior to retransmission based on at least one of a packet priority or an indication from the wireless device.

In another aspect of the disclosure, a method, a computer-readable medium, and an apparatus are provided for wireless communication at a wireless device comprising a base station or a programmable logic controller (PLC). An example apparatus transmits, to a first UE, a first packet and a second packet for sidelink retransmission to at least one additional UE, the second packet being transmitted after the first packet. Then, the apparatus transmits an indication to the first UE to drop the first packet or the second packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
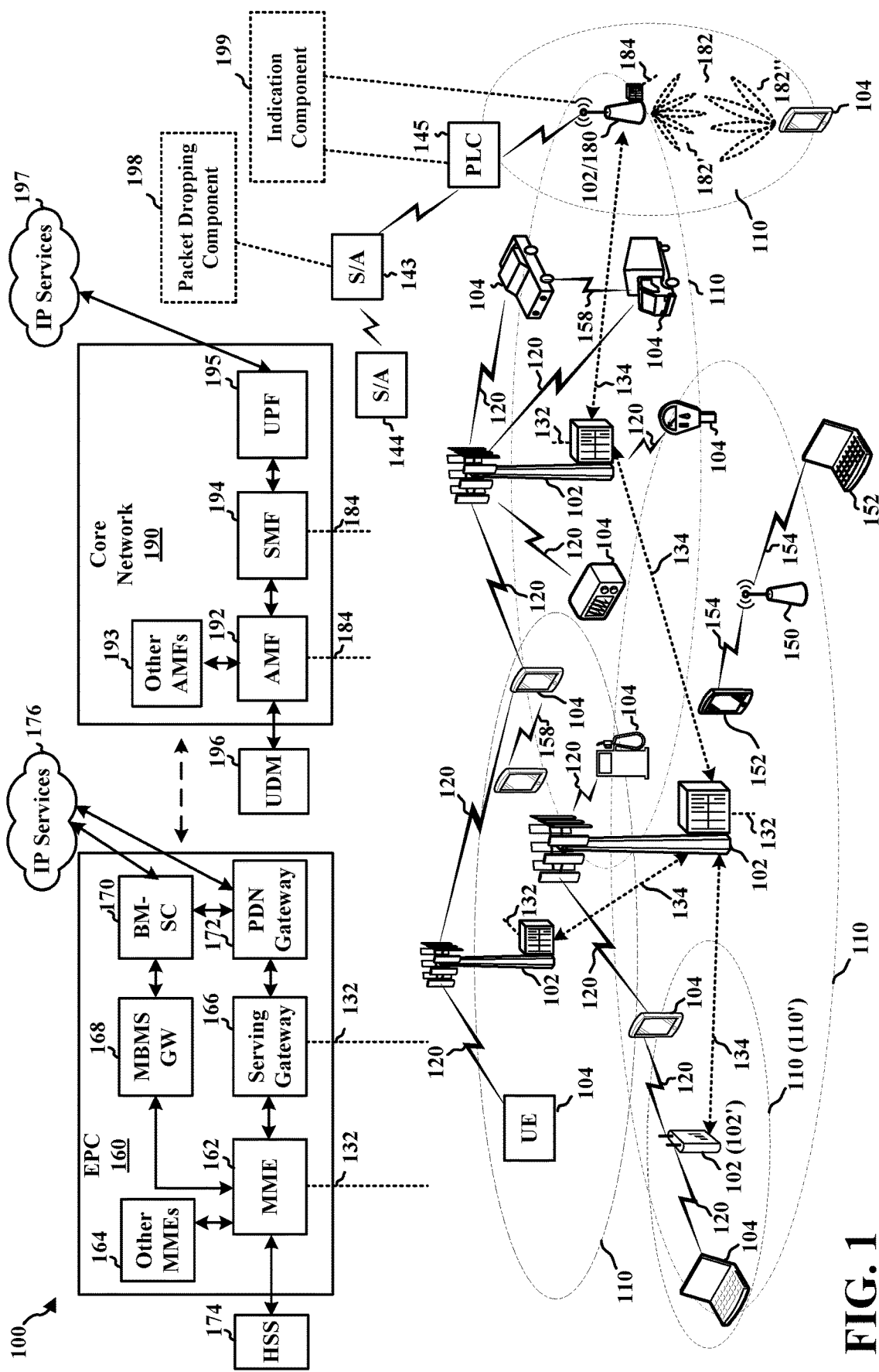
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some wireless communication may be performed in connection with, for example, factory automation, and may comprise Industry IoT (IIoT) based communication. Some equipment may include a sensor, an actuator, a piece of industrial equipment, etc. A Programmable Logic Controller (PLC) may receive information from such sensor(s)/actuator(s) and may provide commands to the sensor(s)/actuator(s) or to factory equipment associated with the sensor(s)/actuator(s). For example, a PLC may automate control of machines and control systems of industrial electromechanical processes, such as controlling machinery on factory assembly lines, amusement rides, light fixtures, etc. The communication between a wireless device, such as a base station and/or a PLC, and the sensors/actuators may have low latency requirements and high reliability requirements. For example, there may be a latency requirement of less than 2 ms or less than 1 ms for the communication. There may additionally or alternatively be a reliability requirement on the order of $10^{-5}$ or $10^{-6}$, such as 99.9999% reliability, for the communication. The latency and reliability may apply to data channels and/or control channels.

Aspects of the present disclosure help to improve reliability by utilizing sidelink for retransmission of blocked transmissions between a wireless device, such as base station and/or a PLC, and a target IIOT device, such as a sensor, an actuator, a piece of industrial equipment, etc. For example, a wireless device may transmit a first data transmission to the target IIOT device and may receive feedback indicating for the data to be retransmitted to the target IIOT device. The wireless device may transmit the data to a helper IIOT device, and the helper IIOT device may retransmit the data to the target IIOT device.

However, the helper IIOT device may have limited memory storage capacity and may be incapable of storing all data received for retransmission. Aspects of the present disclosure help improve reliability by employing techniques that utilize the memory storage capacity of the helper IIOT device when using sidelink for retransmissions. For example, when the helper IIOT device receives a new packet for retransmission, the helper IIOT device may determine to drop a stored packet or to drop the new packet based on a priority of the stored packet and the new packet. In some examples, the helper IIOT device may receive an indication from the wireless device regarding which packet to drop. In some examples, the helper IIOT device may provide memory storage capacity information to the wireless device. The wireless device may then determine whether or not to transmit the new packet to the helper IIOT device based on the memory storage capacity information. Additionally or alternatively, the wireless device may use the memory storage capacity information to determine whether to include the helper IIOT device as a helper IIOT device for sidelink retransmissions to the target IIOT device. Utilizing the memory storage capacity of the helper IIOT device retransmission may improve the reliability of the communication between the wireless device and the target IIOT device.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur do to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to measure and select receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other

MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication may be performed in connection with factory automation, e.g., and may comprise IIoT based communication. Some equipment may include a sensor, an actuator, a piece of industrial equipment, etc. A PLC 145 may receive information from such sensor(s)/actuator(s) 143 and may provide commands to the sensor(s)/actuator(s) 143 or to factory equipment associated with the sensor(s)/actuator(s) 143. For example, a PLC may automate control of machines and control systems of industrial electromechanical processes, such as controlling machinery on factory assembly lines, amusement rides, light fixtures, etc. In some aspects, a PLC 145 may transmit data, either uplink data or sidelink data, to sensor(s)/actuator(s) 143.

Referring again to FIG. 1, in certain aspects, the IIOT device, such as the sensor(s)/actuator(s) 143 (and, generally, referred to herein as the UE 104) may be configured to manage one or more aspects of wireless communication via a packet dropping policy when one or more packets for sidelink retransmission may be dropped due to memory storage capacity of the IIOT device. As an example, in FIG. 1, the UE 104/sensor(s)/actuator(s) 143 may include a packet dropping component 198 configured to receive, from a wireless device, a first packet and a second packet for sidelink retransmission to at least one second UE (e.g., the sensor/actuator 144), the second packet being received after the first packet. The packet dropping component 198 may also be configured to drop the first packet or the second packet prior to retransmission based on at least one of a packet priority or an indication from the wireless device.

Still referring to FIG. 1, in certain aspects the base station 180/PLC 145 (generally referred to herein as a wireless device) may be configured to manage one or more aspects of wireless communication via a packet dropping policy when one or more packets for sidelink retransmission may be dropped by a helper UE (e.g., the sensor/actuator 143) due to memory storage capacity of the helper UE. As an example, in FIG. 1, the base station 180/PLC 145 may include an indication component 199 configured to transmit, to a first UE (e.g., the sensor/actuator 143), a first packet and a second packet for sidelink retransmission to at least one additional UE (e.g., the sensor/actuator 144), the second packet being transmitted after the first packet. The indication component 199 may also be configured to transmit an indication to the first UE (e.g., the sensor/actuator 143) to drop the first packet or the second packet.

Although the following description provides examples directed to sidelink communications in an IIOT environment, the concepts described herein may be applicable to uplink communications and/or downlink communications and/or in environments in which sidelink communications may be beneficial. Aspects of the communication may be based on PC5 or sidelink communication e.g., as described in connection with the example in FIG. 2. Furthermore, while the following description provides examples directed to 5G NR, the concepts described herein may be applicable to other similar areas, such as LTE, LTE-A, CDMA, GSM, and/or other wireless technologies, in which the memory storage capacity of a helper UE may limit the quantity of packets that may be stored at the helper UE for retransmission.

Figure 2:
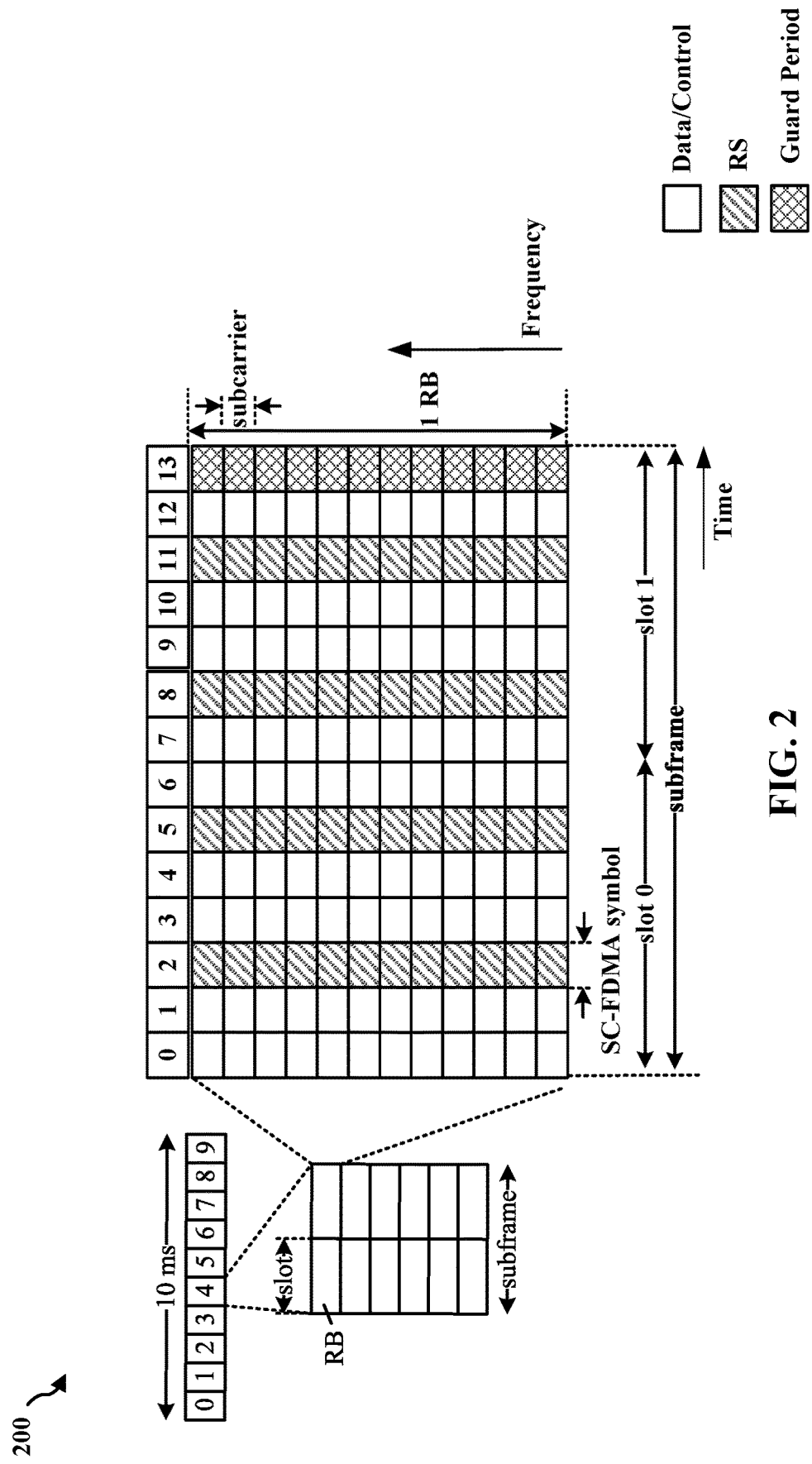
FIG. 2 illustrates example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. FIG. 1 is merely one example of a potential frame structure, and the aspects presented herein can be applied to other frame structures, as well. In some examples, the frame structure may be based on an LTE frame structure. In some examples, the slot structure may be based on a 5G NR frame structure. For example, the concepts described herein may be applicable to other similar areas, such as 5G NR, LTE, LTE-A, CDMA, GSM, and other wireless technologies. The example in FIG. 2 is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise SCI. The position of any of the reference signals, control, and data may be different than the example illustrated in FIG. 2.

Figure 3:
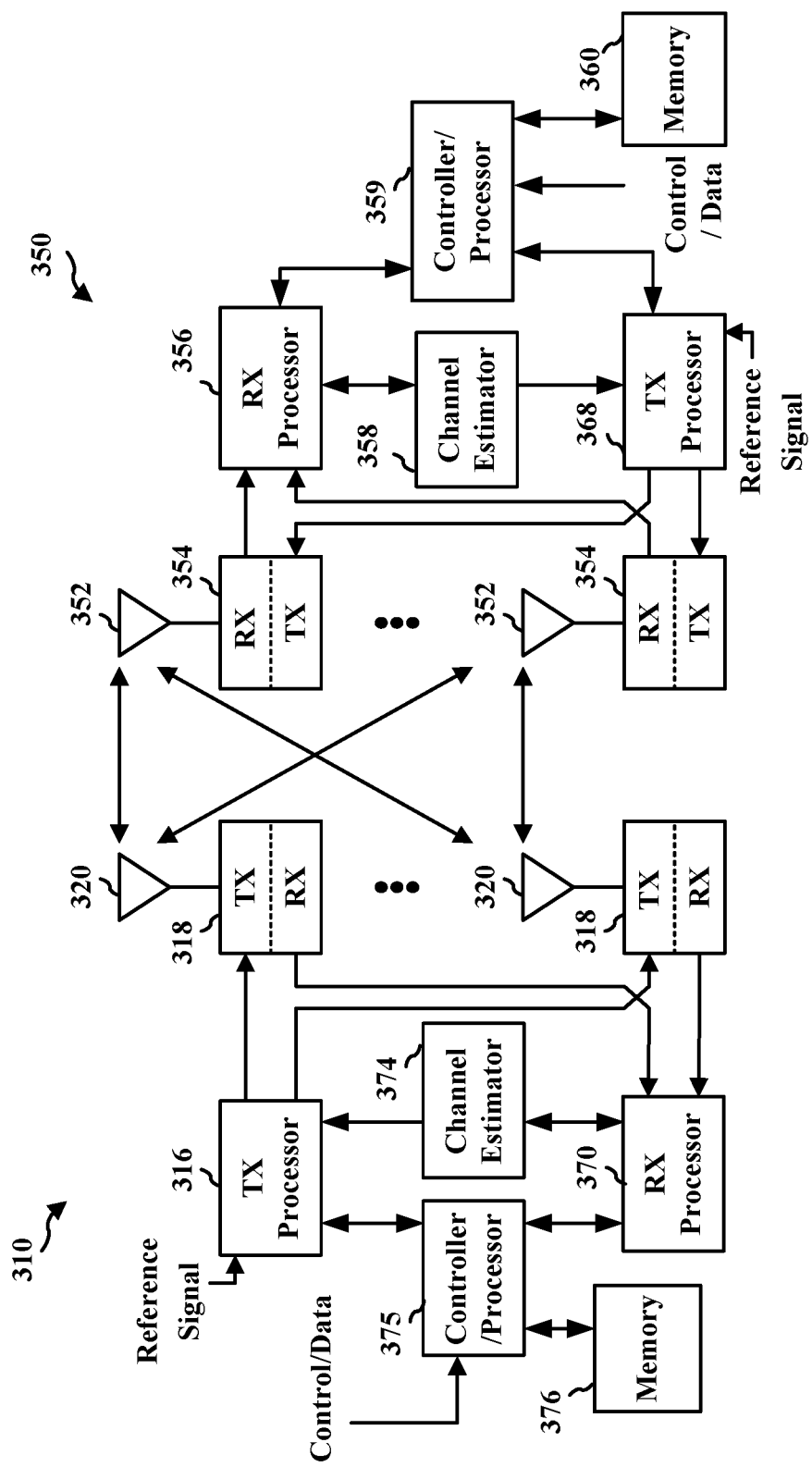
FIG. 3 is a diagram illustrating an example of a base station and UE in an access network.

FIG. 3 is a block diagram 300 of a first device 310 configured for wireless communication with a second device 350. The devices 310 and 350 may be configured to transmit and/or receive V2X or other D2D communication. The communication may be based, e.g., on sidelink, and may be exchanged using a PC5 interface. The device 310 may comprise a UE, an RSU, or another wireless device communicating using V2X or D2D. The receiving device may comprise a UE, an RSU, or another wireless device communicating using V2X or D2D. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the packet dropping component 198 of FIG. 1.

At least one of the TX processor 316, the RX processor 370, and the controller/processor 375 may be configured to perform aspects in connection with the indication component 199 of FIG. 1.

Figure 4:
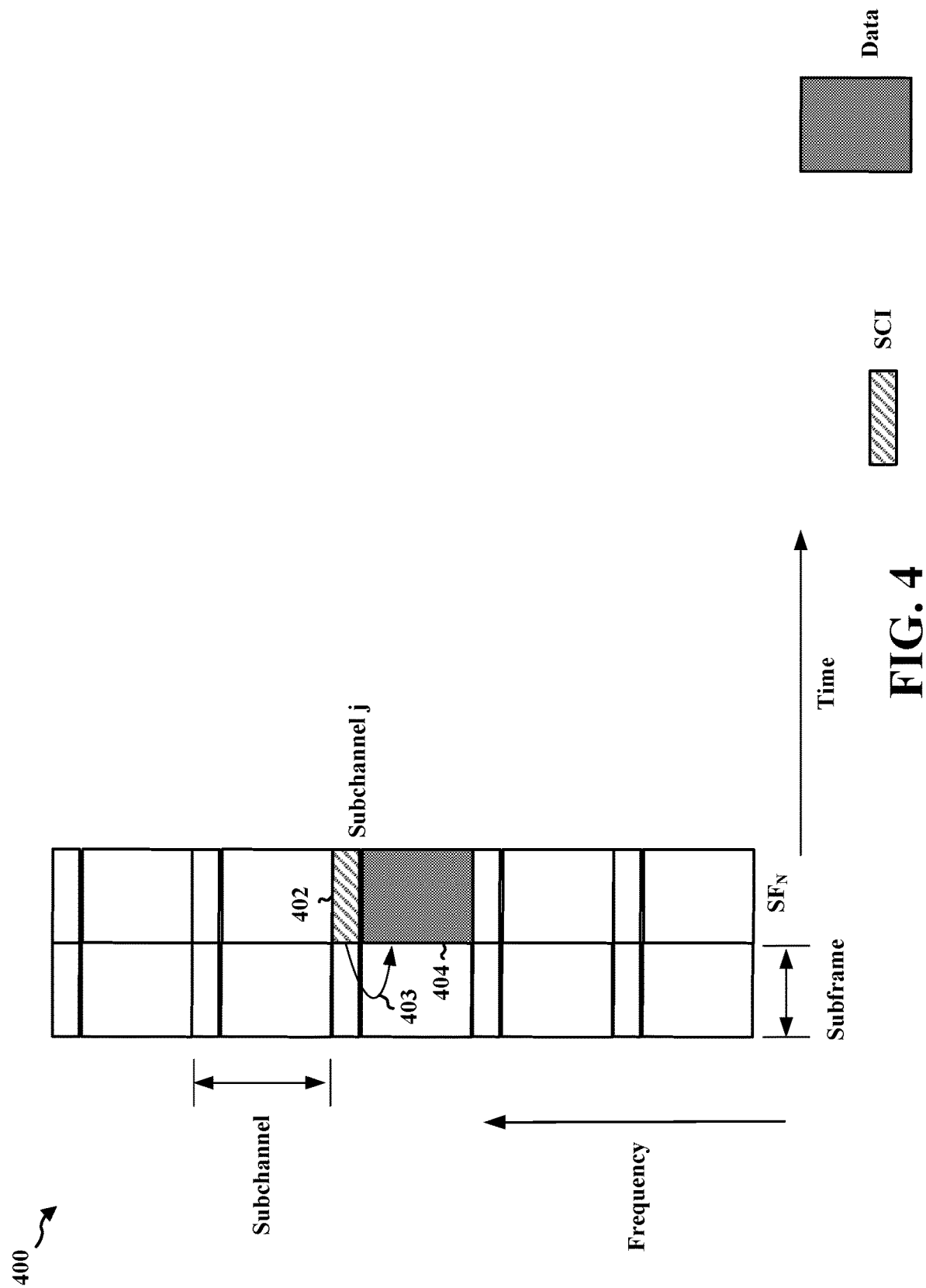
FIG. 4 illustrates an example of a sidelink transmission.

FIG. 4 illustrates an example diagram 400 of sidelink communication. Although FIG. 4 illustrates the concept using subframes, the aspects may be similarly applied to communication based on slots or other timing information. A transmission includes sidelink control information (SCI) 402 and data 404. The example in FIG. 4 illustrates the SCI 402 and the data 404 in adjacent frequency resources. This is merely one example to illustrate the concept of a transmission including data and SCI. The SCI 402 and the data 404 may alternatively be transmitted in non-adjacent frequency resources in other examples. The SCI 402 may be transmitted in a PSCCH, and the data 404 may be transmitted in a PSSCH. As illustrated by the arrow 403, the SCI 402 includes information about the data transmission 404 that enables receiving devices to receive the data 404, e.g., MCS information, information about the frequency and/or time resources used to transmit the data, whether the data is an initial transmission or a retransmission, etc. In some examples, the transmission (e.g., data 404) may be an initial transmission. In some examples, the transmission (e.g., data 404) may be a retransmission of a previous, initial transmission. In examples in which the transmission is a retransmission, the SCI 402 may indicate resources for the retransmission.

In some examples, the transmission may be based on SPS, and the transmission may indicate the following transmission period before the next transmission (e.g., 20 subframes, 50 subframes, 100 subframes, 200 subframes, 1000 subframes, etc.).

The SCI 402 may carry information about the time and/or frequency of the resources for a subsequent transmission. As illustrated, the SCI 402 may carry information about a time gap (e.g., subframe gap) between the two transmissions, information about frequency resources for the second transmission (e.g., a starting sub channel).

Figure 5:
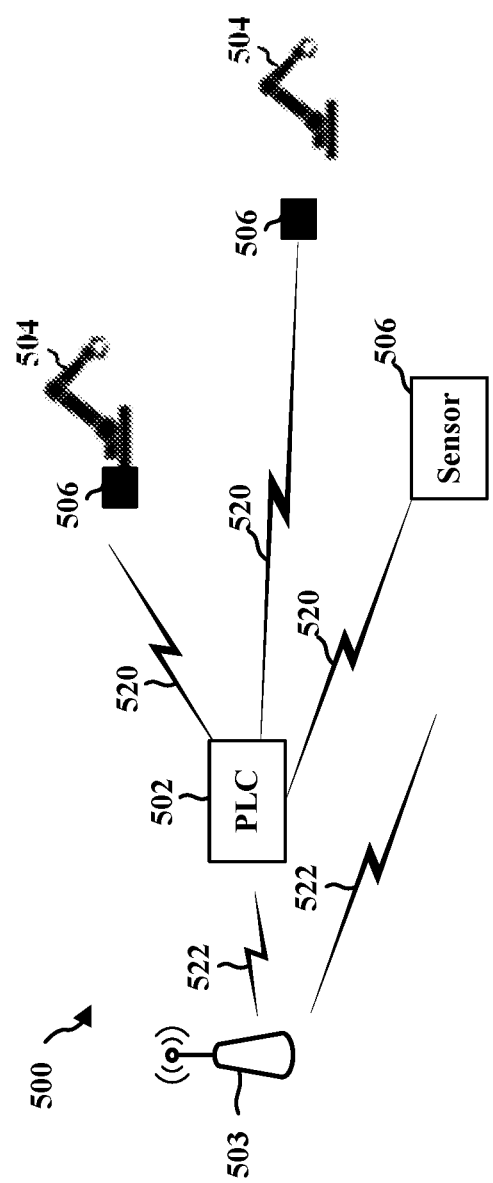
FIG. 5 illustrates an example wireless communication system including a base station, a PLC, and sensor(s)/actuator(s).

Wireless communication may be based on IIoT. Such communication may include communication between a base station and one or more UEs and/or between a PLC and one or more UEs. In some examples, communication may be exchanged between a PLC and sensors, actuators, etc. The PLC may provide commands in wireless signals to factory equipment. Sensor(s)/actuator(s) may be separate from the factory equipment and/or may be comprised in or positioned at a piece of factory equipment. The PLC(s) may automate control of machines and control systems, e.g., of industrial electromechanical processes, such as control of machinery on factory assembly lines, amusement rides, light fixtures, etc. FIG. 5 illustrates an example communication system 500 including a PLC 502 that exchanges wireless communication 520 with sensors/actuators 506 that may be associated with equipment. The communication may also include a base station 503 that exchanges communication 522 with the PLC 502 and/or communication 522 with the sensors/actuators 506.

Figure 6B:
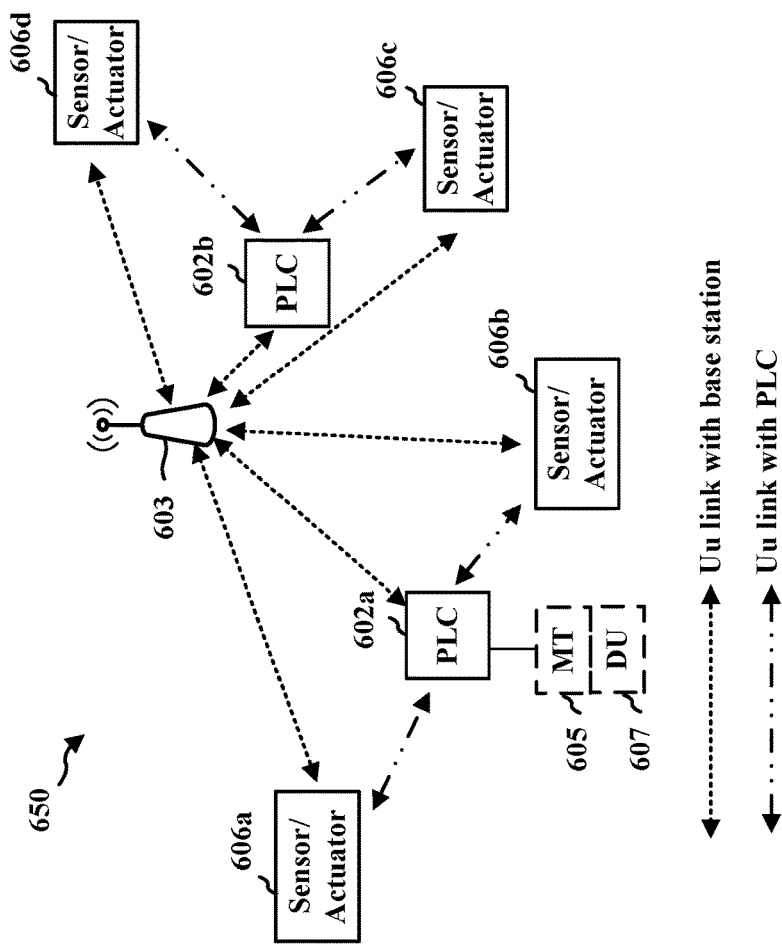
FIGS. 6A and 6B illustrate example aspects of a wireless communication system including a base station, PLC(s), and sensors/actuators.
Figure 6A:
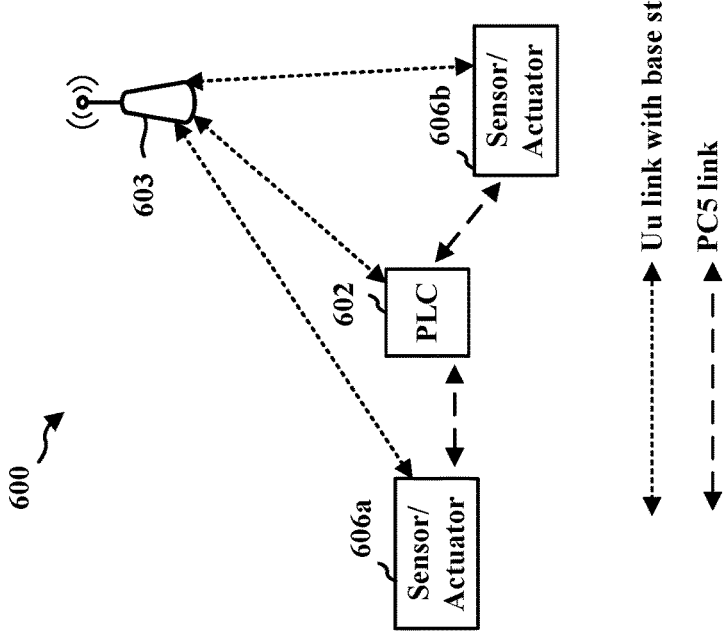

A wirelessly connected PLC may be located closer to factory equipment. For example, PLCs may be located close to machinery, whereas a base station may be ceiling mounted or at a greater distance from the equipment. FIGS. 6A and 6B illustrate communication systems 600 and 650 that include one or more PLCs, multiple sensors/actuators, and a base station.

In FIG. 6A, the communication system 600 includes a PLC 602, multiple sensors/actuators 606a, 606b, and a base station 603. As illustrated, the link between the base station 603 and the PLC may be based on a Uu interface. The links between the base station 603 and the sensors/actuators 606a, 606b may also be based on a Uu interface. The links between the PLC 602 and the sensors/actuators 606a, 606b may be based on a PC5 interface. The PLC 602 in FIG. 6A may operate similar to a UE or as a sidelink device. The PLC 602 in FIG. 6A may use the base station 603 for inter-PLC coordination with other PLCs. The PLC 602 in FIG. 6A may use the base station 603 for a backhaul to a human machine interface (HMI). The PLC 602 in FIG. 6A may use the base station 603 as a system controller. The base station 603 may perform interference management (IM) across multiple PLCs 602. The base station 603 may handle other network functions for the sensors/actuators 606a and 606b, such as initial access with the network, mobility, etc. As the sensors/actuators 606a, 606b of FIG. 6A communicate with the PLC 602 based on sidelink and with the base station 603 based on uplink/downlink, the sensors/actuators 606a, 606b support both Uu and PC5 based communication. As the PLC 602 communicates with the sensors/actuators 606a, 606b based on sidelink and with the base station 603 based on uplink/downlink, the PLC 602 supports both Uu and PC5 based communication.

In some examples, the PLC 602 may operate similar to a small cell or a relay node having a wireless backhaul to the base station 603. In FIG. 6B, the communication system 650 includes a first PLC 602a and a second PLC 602b, multiple sensors/actuators 606a, 606b, 606c, 606d, and a base station 603. As illustrated, the link between the base station 603 and the PLCs 602 may be based on a Uu interface. The links between the base station 603 and the sensors/actuators 606a, 606b, 606c, 606d may be based on a Uu interface. The sensors/actuators 606a, 606b, 606c, 606d may interact with their respective PLC 602a, 602b based on a Uu interface. The PLCs 602a, 602b may use the base station 603 for inter-PLC coordination between PLCs 602a, 602b, for a backhaul to an HMI, for a system controller, etc. The PLCs 602a, 602b may include aspects of an integrated access and backhaul (IAB) framework. The PLCs 602 may each operate based on dual roles. The PLCs 602 may each include a mobile termination (MT) component 605, e.g., that operates similar to a UE in receiving control/data from the base station 603. The PLCs 602 may each include a distributed unit (DU) component 607 that schedules resources for communication with their respective sensors/actuators 606a, 606b, 606c, 606d and that provides downlink communication to their respective sensors/actuators 606a, 606b, 606c, 606d.

The transmission of control by the base station 603 may help to improve reliability. Such control by the base station 603 may involve two hops in order to provide the control to the sensor/actuator, e.g., a first hop from a PLC to the base station and a second hop from the base station to the sensor/actuator. In some examples, a portion of scheduling for the sensors/actuators 606a, 606b may be provided by the base station 603, and another portion of the scheduling for the sensor/actuators 606a, 606b may be provided by the PLC 602. Providing some control directly from the PLC may help to reduce over-the-air signaling and may improve latency. However, transmissions from the PLC 602 may be blocked for a particular sensor/actuator (e.g., by the presence of a physical object within the environment of the PLC 602, the base station 603, and/or the sensors/actuators 606). Blocks of links between wireless devices, such as the PLC 602 and/or the base station 603, and various sensors/actuators 606 may last for different amounts of time.

Figure 7B:
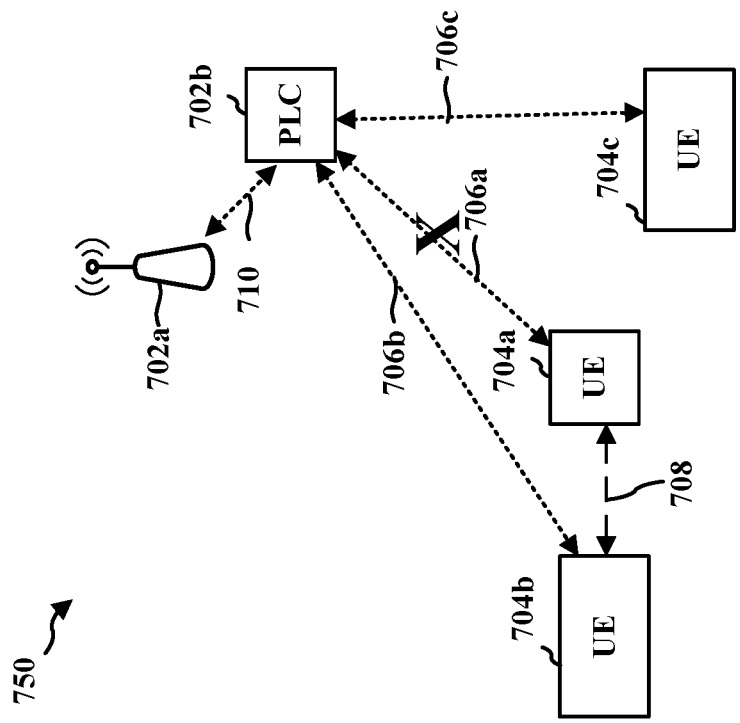
FIGS. 7A and 7B illustrate example aspects of a wireless communication system including a base station, PLC(s), and sensors/actuators.
Figure 7A:
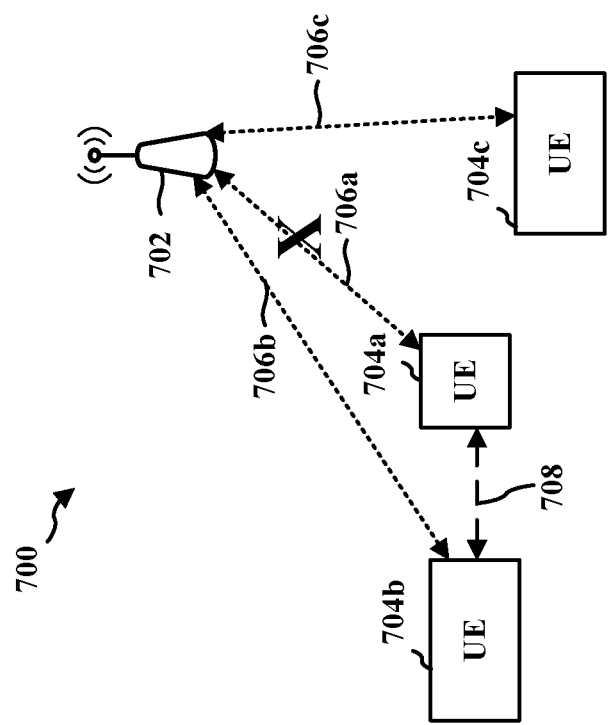

FIGS. 7A and 7B illustrate examples of wireless communication systems 700 and 750, respectively, in accordance with aspects of the present disclosure. The wireless communication system 700 includes a base station 702 and UEs 704. Aspects of the UEs 704 may be implemented by the sensor(s)/actuator(s) 504, 506 of FIG. 5 and/or the sensor(s)/actuator(s) 606 of FIGS. 6A and 6B. In the illustrated example, the base station 702 may establish respective communication links 706 with the UEs 704.

Due to an issue, such as blockage or fading, the communication link 706a between the base station 702 and the first (or target) UE 704a may be degraded, fail, or be dropped. Accordingly, the base station 702 may leverage sidelink channels (e.g., a sidelink channel 708) to communicate with the target UE 704a. In the illustrated example of FIG. 7A, the base station 702 may determine that the second UE 704b is in a helper UE group to facilitate communication between the base station 702 and the target UE 704a. Accordingly, in FIG. 7A, the second UE 704b is helping or assisting the target UE 704a by forwarding or retransmitting data received from the base station 702 to the target UE 704a through the sidelink 708.

In some examples, to facilitate communication between the base station 702 and the target UE 704a, the base station 702 may transmit a control message to one or more UEs nearby the target UE 704a requesting one or more reports. For example, the base station 702 may transmit a control message to the second UE 704b and the third UE 706b requesting that the respective UEs 704b, 704c report various information to the base station 702, such as sidelink measurements, UE capability information, etc. In some examples, the UE capability information may include a storage capacity of the respective UE 704. For example, the storage capacity may include a memory size of the respective UE 704 for retransmission storage. In some such examples, the base station 702 may use the storage capacity of the UEs 704 to determine whether to include the respective UE 704 in a helper UE group to facilitate communication between the base station 702 and the target UE 704a. For example, the base station 702 may compare the storage capacity of each of the UEs 704b, 704c to a sidelink retransmission storage capacity threshold to determine whether to use the respective UE as a helper UE and to transmit packets to the respective UE for sidelink retransmission. In the illustrated example, the base station 702 may determine to include the second (or helper) UE 704b in a helper UE group associated with the target UE 704a, and may determine to exclude the third UE 704c in the helper UE group.

FIG. 7B illustrates the wireless communication system 750 including a base station 702a, a PLC 702b, and UEs 704. Aspects of the UEs 704 may be implemented by the sensor(s)/actuator(s) 504, 506 of FIG. 5 and/or the sensor(s)/actuator(s) 606 of FIGS. 6A and 6B. In the illustrated example, the PLC 702b communicates with the base station 702a over a communication link 710. Further, the PLC 702b communicates with the UEs 704 over respective communication links 706.

However, due to an issue, such as blockage or fading, the communication link 706a between the PLC 702b and the target UE 704a may be degraded, fail, or be dropped. Accordingly, the PLC 702b may leverage sidelink channels (e.g., a sidelink channel 708) to communicate with the target UE 704a. In the illustrated example of FIG. 7B, the PLC 702b may determine that the second UE 704b is in a helper UE group to facilitate communication between the PLC 702b and the target UE 704a. Accordingly, in FIG. 7B, the second UE 704b is helping or assisting the target UE 704a by forwarding or retransmitting data received from the PLC 702b to the target UE 704a through the sidelink 708.

In some examples, to facilitate communication between the PLC 702b and the target UE 704a, the PLC 702b may use various reports received from one or more UEs nearby the target UE 704a. Since the base station 702a or the PLC 702b may configure the reporting of the UEs 704, the PLC 702b may utilize various reports received from the nearby UEs (e.g., the second UE 704b and the third UE 704c) to select the sidelink channel 708 between the target UE 704a and a possible helper UE (e.g., the second UE 704b and/or the third UE 704c). In some examples, the PLC 702b may transmit a control message to the second UE 704b and the third UE 706b requesting that the respective UEs 704b, 704c report various information to the PLC 702b, such as sidelink measurements, UE capability information, etc. In some examples, the UE capability information may include a storage capacity of the respective UE 704. For example, the storage capacity may include a memory size of the respective UE 704 for retransmission storage. In some such examples, the PLC 702b may use the storage capacity of the UEs 704 to determine whether to include the respective UE 704 in a helper UE group to facilitate communication between the PLC 702b and the target UE 704a. For example, the PLC 702b may compare the storage capacity of each of the UEs 704b, 704c to a sidelink retransmission storage capacity threshold to determine whether to use the respective UE as a helper UE and to transmit packets to the respective UE for sidelink retransmission. In the illustrated example, the PLC 702b may determine to include the second UE 704b in a helper UE group associated with the target UE 704a, and may determine to exclude the third UE 704c in the helper UE group.

Figure 8:
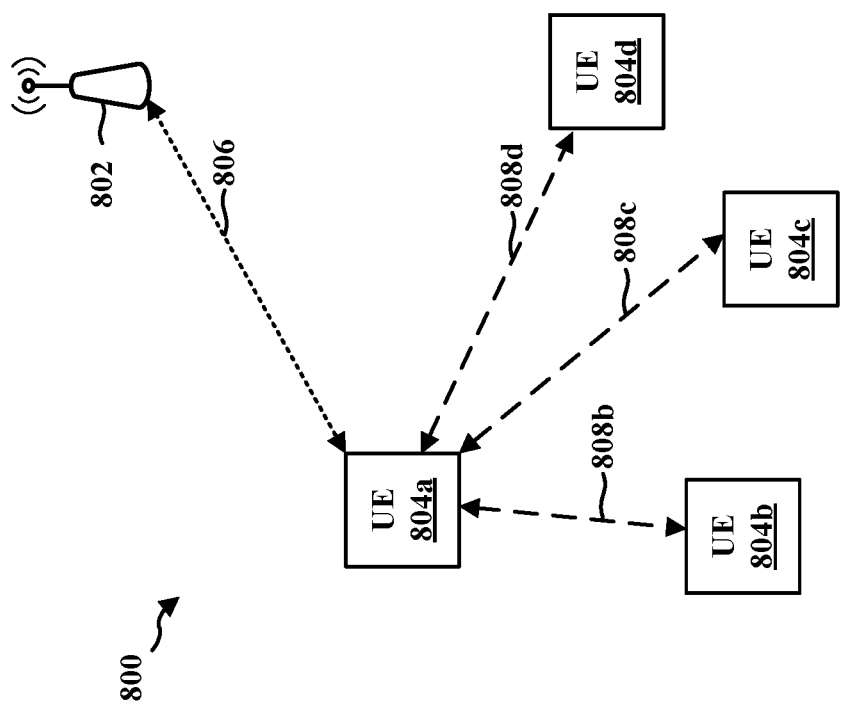
FIG. 8 illustrates an example aspect of a wireless communication system including a wireless device and UEs.

However, after a UE is selected to be a helper UE (e.g., the second UE 704b), in some examples, the helper UE may incur instances in which it may not have enough storage capacity to store one or more packets received for retransmission. For example, FIG. 8 illustrates an example wireless communication system 800 including a wireless device 802 in communication with multiple UEs 804. Aspects of the wireless device 802 may be implemented by a base station, such as the base station 503 of FIG. 5, the base station 603 of FIGS. 6A and 6B, the base station 702 of FIG. 7A, and/or the base station 702a of FIG. 7B, and/or may be implemented by a PLC, such as the PLC 502 of FIG. 5, the PLCs 602 of FIG. 6B, and/or the PLC 702b of FIG. 7B. Aspects of the UEs 804 may be implemented by the sensor(s)/actuator(s) 504, 506 of FIG. 5, the sensor(s)/actuator(s) 606 of FIGS. 6A and 6B, and/or the UEs 704 of FIGS. 7A and 7B. The wireless device 802 may establish respective communication links 806 to communicate with the UEs 804.

However, due to an issue, such as blockage or fading, the communication links between the wireless device 802 and three UEs 804b, 804c, 804d may be degraded, fail, or be dropped. Accordingly, the wireless device 802 may leverage sidelink channels (e.g., sidelink channels 808) to communicate with target UEs 804b, 804c, 804d. In the illustrated example of FIG. 8, the wireless device 802 may determine to use the UE 804a as a helper UE to facilitate communication between the wireless device 802 and the respective target UEs 804, 804c, 804d.

In the illustrated example of FIG. 8, the wireless device 802 determines a first helper UE group including the helper UE 804a to facilitate communication between the wireless device 802 and a first target UE 804b. The wireless device 802 may also determine a second UE group including the helper UE 804a to facilitate communication between the wireless device 802 and a second target UE 804c, and a third UE group including the helper UE 804a to facilitate communication between the wireless device 802 and a third target 804d.

In the illustrated example, as the helper UE 804a may be serving multiple target UEs 804b, 804c, 804d, the helper UE 804a may store packets of those respective target UEs 804b, 804c, 804d for sidelink retransmission (e.g., via the respective sidelink channels 808). If the helper UE 804a does not have memory resources capable of storing each of packets, the helper UE 804 may drop one or more of the packets.

Examples disclosed herein provide techniques for determining which packet(s), if any, a helper UE may drop when, for example, the helper UE is unable to store all packets received for sidelink retransmission. As disclosed herein, in some examples, the helper UE may determine which packet(s) to drop based on priority. For example, the helper UE may store one or more packets for sidelink retransmission that are each associated with a respective priority. The helper UE may then receive a new packet and determine to drop at least one packet (e.g. one of the stored packets or the new packet) due to the limited storage capabilities of the helper UE. In some such examples, the helper UE may determine to drop one of the stored packets or the new packet based on respective priorities.

In some examples, the helper UE may determine which packet(s) to drop based on packet-identifying information. For example, the helper UE may store one or more packets for sidelink retransmission that are each associated with a respective helper UE group and/or a target UE. The helper UE may then receive a new packet and determine to drop at least one packet (e.g. one of the stored packets or the new packet) due to the limited storage capabilities of the helper UE. In some such examples, the helper UE may determine to drop one of the stored packets or the new packet based on helper UE group and/or the target UE associated with a packet. For example, the helper UE may receive an indication (e.g., from a wireless device) identifying a helper UE group and/or a target UE for which the helper UE is to drop packet(s) when the helper UE is unable to store the new packet.

Figure 9:
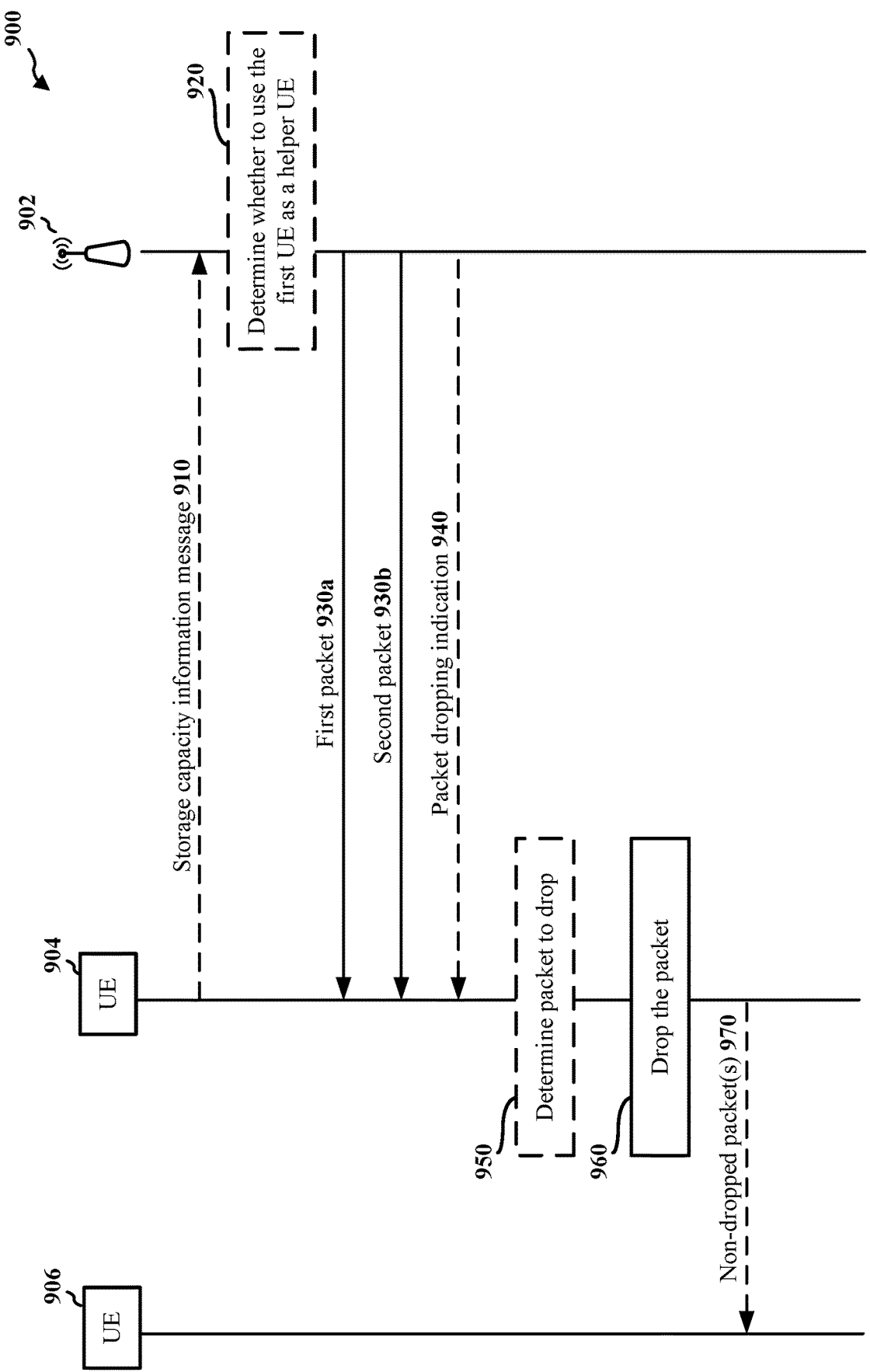
FIG. 9 illustrates an example communication flow between devices communicating based on sidelink communication.

FIG. 9 illustrates an example communication flow 900 between a wireless device 902, a first UE 904, and a second UE 906 involving the usage of memory of a helping UE for sidelink retransmission. Aspects of the wireless device 902 may be implemented by the base station 102/180 of FIG. 1, the base station 503 of FIG. 5, the base station 603 of FIGS. 6A and 6B, the base station 702 of FIG. 7A, and/or the base station 702a of FIG. 7A, and/or the PLC 145 of FIG. 1, the PLC 502 of FIG. 5, the PLC 602 of FIGS. 6A and 6B, the PLC 702b of FIG. 7B, and/or, more generally, the wireless device 802 of FIG. 8. Aspects of the first UE 802 and the second UE 804 may be implemented by the UE 104 of FIG. 1, the sensor/actuator 143 of FIG. 1, the sensors/actuators 506 of FIG. 5, the sensors/actuators 606 of FIGS. 6A and 6B, the UEs 704 of FIGS. 7A and 7B, and/or the UEs 804 of FIG. 8.

In the illustrated example of FIG. 9, a communication link between the wireless device 902 and the second UE 906 may be degraded, fail, or be dropped due to an issue, such as blockage or fading. The wireless device 902 may then attempt to employ the first UE 904 as a helper UE (sometimes referred to as a "helping UE") to help or assist the target UE 906 by forwarding or retransmitting data received from the wireless device 902 to the target UE 906 through a sidelink channel between the first UE 904 and the target UE 906.

In some examples, the first UE 904 may transmit a storage capacity information message 910 that is received by the wireless device 902. The storage capacity information message 910 may include a memory size of the first UE 904 for retransmission storage. In some examples, the storage capacity information message 910 may be included in a UE capability report provided by the first UE 904. For example, the first UE 904 may transmit the storage capacity information message 910 after receiving a control message from the wireless device 902 requesting that the first UE 904 provide various reports to the wireless device 902, including UE capability information.

At 920, the wireless device 902 may determine, at 920, whether to use the first UE 904 as a helper UE. For example, the wireless device 902 may compare the memory size of the first UE 904 for retransmission storage to a sidelink retransmission storage capacity threshold to determine whether to use the first UE 904 as a helper UE for facilitating communication between the wireless device 902 and the target UE 906. In some such examples, the wireless device 902 may determine to use the first UE 904 as a helper UE when the memory size of the first UE 904 for retransmission storage is greater than or equal to the sidelink retransmission storage capacity threshold, or may determine not to use the first UE 904 as a helper UE when the memory size is less than the sidelink retransmission storage capacity threshold. However, other examples may employ additional or alternative techniques for determining whether to use the first UE 904 as a helper UE based on the storage capacity information message 910.

Assuming that the wireless device 902 determines to use the first UE 904 as a helper UE, the wireless device 902 may then transmit packets (sometimes referred to as "transport blocks"), including at least a first packet 930a and a second packet 930b, that are received by the helper UE 904. In the illustrated example, the first packet 930a may be received by the helper UE 904 before the second packet 930b. In some examples, the packets 930 may be downlink packets received from a base station. In some examples, the packets 930 may be downlink packets or sidelink packets received from a PLC. In some examples, the helper UE 904 may receive the packets 930 for sidelink retransmission to one or more different UEs, such as the target UE 906.

In some examples, the wireless device 902 may transmit a packet dropping indication 940 that is received by the helper UE 904. In some examples, the packet dropping indication 940 may signal to the helper UE 904 to drop a packet based on a storage capacity of the helper UE 904. For example, the helper UE 904 may receive and store the first packet 930a. The helper UE 904 may then receive the second packet 930b and determine that the helper UE 904 is unable to store the second packet 930b due to the memory size for retransmission storage of the helper UE 904. In some examples, the packet dropping indication 940 may include a priority-based indication indicating to the helper UE 904 to employ priority-based techniques for determine which packet(s), if any, to drop. In some examples, the packet dropping indication 940 may include an identifier of a packet or group of packets to drop.

At 950, the helper UE 904 may determine which packet(s) to drop. In some examples, the helper UE 904 may determine to drop a packet based on a priority of the packet. For example, the helper UE 904 may compare a priority of the first packet 930a to a priority of the second packet 930b and determine to drop the packet with the relatively lower priority.

In some examples, the helper UE 904 may receive the priority of the first packet 930a and the priority of the second packet 930b from the wireless device 902. For example, the wireless device 902 may transmit the priorities of the packets 930a, 930b in group information. In some such examples, the group information may comprise an SPS configuration. For example, the wireless device 902 may transmit the SPS configuration via RRC signaling. Based on the received priorities, the helper UE 904 may determine to drop a stored packet (e.g., the first packet 930a) when the priority of the stored packet is less than the priority of a new packet (e.g., the second packet 930b), and may determine to drop the new packet when the priority of the new packet is less than the priority of the stored packets. In some examples, if the helper UE 904 determines that the respective priorities of the stored packets is higher than the priority of the new packet, the helper UE 904 may determine to drop the new packet.

In some examples, the priorities of the packets may be included in respective payloads of the packets. For example, the first packet 930a may include SCI (such as the example SCI 402 of FIG. 4) and data (such as the example data 404 of FIG. 4). Similarly, the second packet 930b may include SCI and data. In some such examples, the priority of each of the packets 930a, 930b may be included in the data portions of the respective packets 930a, 930b. In some such examples, the packets 930a, 930b may be received in SPS transmissions. While the helper UE 904 may be able to determine the priorities of the stored packets (e.g., via decoding or processing techniques of the respective payloads when received), the helper UE 904 may be unable to determine the priority of the new packet (e.g., the second packet 930b). In some such examples, the helper UE 904 may determine to drop the stored packet associated with the lowest priority. For example, the helper UE 904 may store a plurality of packets, including the first packet 930a, and, based on the respective priorities, determine to drop the packet having the lowest priority. In some examples, the helper UE 904 may determine to drop the new packet (e.g., the second packet 930b).

In some examples, the helper UE 904 may determine the priorities of the packets 930 based on the time at which the respective packets are received. In the illustrated example of FIG. 9, the helper UE 904 receives the first packet 930a before receiving the second packet 930b. In some examples, the helper UE 904 may determine to drop the newest received packet (e.g., the second packet 930b). In some examples, the helper UE 904 may determine to drop the oldest received packet (e.g., the first packet 930a).

In some examples, the helper UE 904 may determine the priorities of the packets 930 based on a delivery deadline associated with each packet. For example, the SCI of each of the packets 930a, 930b may indicate a delivery deadline for delivering each respective packet. In some examples, the helper UE 904 may determine, based on the respective delivery deadlines, to drop the packet that is the first to expire. In some examples, the helper UE 904 may determine, based on the respective delivery deadlines, to drop the packet that is the last to expire.

In some examples, the helper UE 904 may determine to drop a packet based on packet-identifying information provided by the wireless device 902. For example, the helper UE 904 may explicitly signal to the helper UE 904 (e.g., via the packet dropping indication 940) to drop certain received packets. As described above, when the wireless device 902 determines the one or more helper UE groups for facilitating communication between the wireless device 902 and the target UE(s), the wireless device 902 may transmit a control message (e.g., via DCI) indicating to the helper UE that the helper UE is part of the helper UE group. In some such examples, each of the helper UE groups may be associated with a respective group identifier. In some examples, the wireless device 902 may indicate to the helper UE 904 to drop packets associated with a helper UE group. For example, the wireless device 902 may include a group identifier in the packet dropping indication 940 indicating to the helper UE 904 to drop received packets for sidelink retransmission that are associated with the helper UE group corresponding to the group identifier.

At 960, the helper UE 904 may drop the determined packet. For example, the helper UE 904 may drop the packet based on priority and/or based packet-identifying information.

The helper UE 904 may then retransmit the non-dropped packet(s) 970 to the target UE 906 using a sidelink channel, such as the example sidelink channels 808 of FIG. 8. In some examples, the helper UE 904 may relay the non-dropped packet(s) 970 to the target UE 906 without any processing or decoding. In some examples, the helper UE 904 may at least partially decode the data received from the wireless device 902 before retransmitting the non-dropped packet(s) 970 to the target UE 906. In some examples, the helper UE 904 may retransmit the non-dropped packet(s) 970 in accordance with a grant received from the wireless device 902, and the grant may schedule transmitting the non-dropped packet(s) 970 via the sidelink channel.

Figure 10:
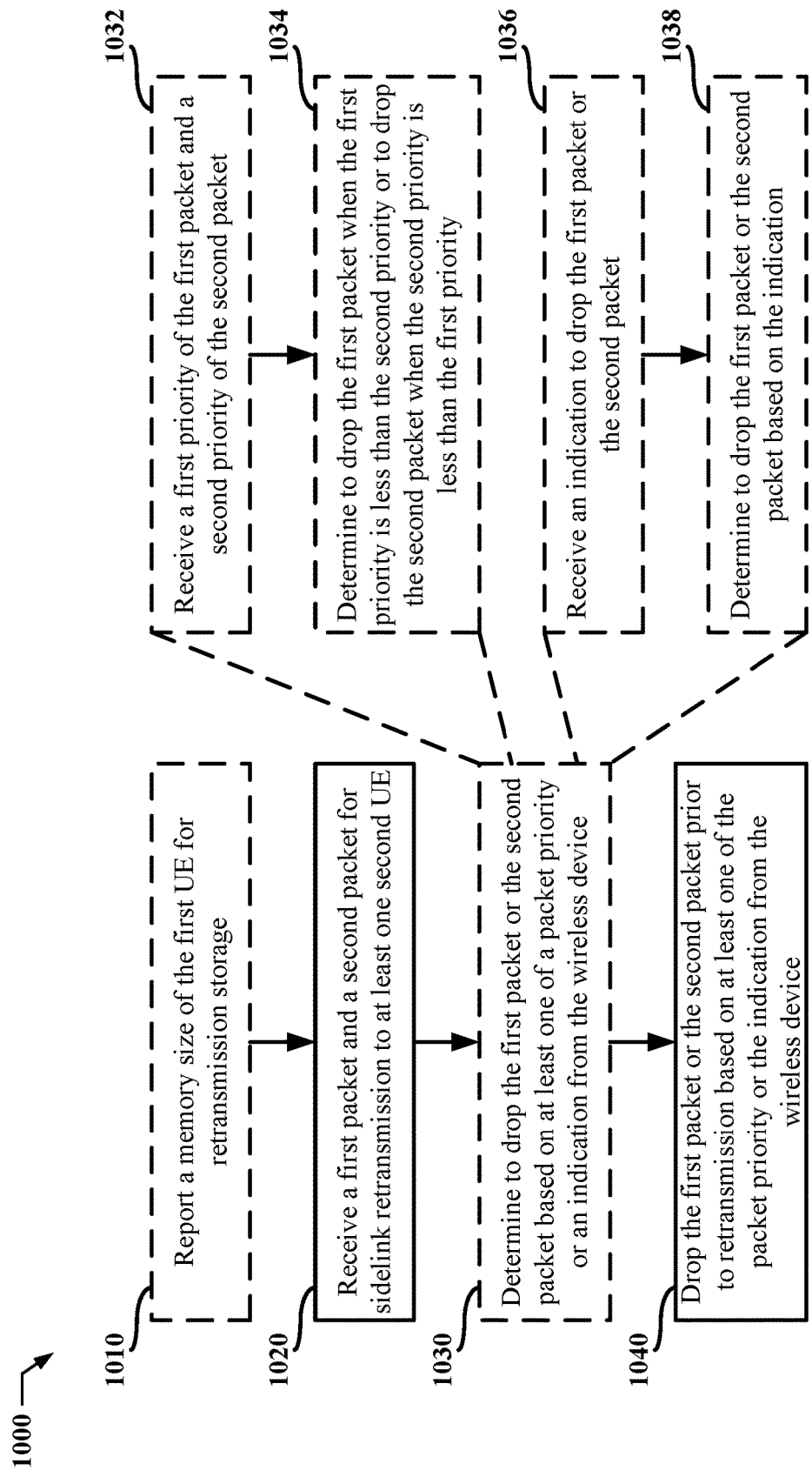
FIG. 10 is a flowchart of a method of wireless communication.

FIG. 10 is a flowchart 1000 of a method of wireless communication. The method may be performed by a first UE (e.g., the UE 104 of FIG. 1, the device 350 of FIG. 3, the sensor/actuator 143 of FIG. 1, the sensors/actuators 506 of FIG. 5, the sensors/actuators 606 of FIGS. 6A and 6B, the UEs 704 of FIGS. 7A and 7B, the UEs 804 of FIG. 8, and/or the helper UE 904 of FIG. 9; the apparatus 1102/1102' of FIGS. 11/12; the processing system 1214, which may include the memory 360 and which may be the entire UE (e.g., the device 350) or a component of the device 350, such as the TX processor 368, the RX processor 356, and/or the controller/processor 359). Optional aspects are illustrated with a dashed line. The method may help improve reliability of sidelink retransmissions by employing a packet dropping policy for the first UE (e.g., a helper UE) based on memory storage capacity information associated with the first UE.

At 1010, the first UE may report a memory size of the first UE for retransmission storage, as described above in connection with, for example, the storage capacity information message 910 of FIG. 9. For example, a reporting component 1108 of the apparatus 1102 in FIG. 11 may be configured to report, to a wireless device, the memory size of the first UE for retransmission storage. In some examples, the first UE may report the memory size in a UE capability information message to the wireless device (e.g., a base station or a PLC).

At 1020, the first UE receives a first packet and a second packet for sidelink retransmission to at least one second UE, as described above in connection with, for example, the first packet 930a and the second packet 930b of FIG. 9. For example, a reception component 1104 of the apparatus 1102 in FIG. 11 may be configured to receive, from a wireless device, the first packet and the second packet. In some examples, the first packet and the second packet comprise downlink packets received from a base station. In some examples, the first packet and the second packet comprise downlink packets or sidelink packets received from a PLC. In some examples, the first packet and the second packet may be for sidelink retransmission to different UEs.

At 1030, the first UE may determine to drop the first packet or the second packet based on at least one of a packet priority or an indication from the wireless device, as described above in connection with, for example, 950 of FIG. 9. For example, a packet dropping component 1114 of the apparatus 1102 in FIG. 11 may be configured to determine to drop the first packet or the second packet based on at least one of the packet priority or the indication from the wireless device.

At 1040, the first UE drops the first packet or the second packet prior to retransmission based on at least one of the packet priority or the indication from the wireless device, as described above in connection with, for example, 960 of FIG. 9. For example, the packet dropping component 1114 of the apparatus 1102 in FIG. 11 may be configured to drop the first packet or the second packet prior to retransmission. In some examples, the first UE may drop the first packet or the second packet based on a memory storage capacity of the first UE (e.g., the memory size of the first UE for retransmission storage).

Referring again to 1030, in some examples, the first UE may determine to drop the first packet or the second packet based on at least the packet priority. For example, at 1032, the first UE may receive a first priority of the first packet and a second priority of the second packet, as described above in connection with, for example, the packets 930 of FIG. 9. For example, a priority handling component 1110 of the apparatus 1102 in FIG. 11 may be configured to receive the first priority of the first packet and the second priority of the second packet. In some examples, the first UE may receive the first priority and the second priority in group information from a base station. In some such examples, the group information may include an SPS configuration. In some examples, the first priority may be included in a first payload of the first packet and the second priority may be included in a second payload of the second packet. In some such examples, the first packet and the second packet may be received in SPS transmissions. In some examples, the first UE may determine the first priority based on a first reception time for the first packet and may determine the second priority based on a second reception time for the second packet. In some examples, the first UE may determine the first priority based on a first delivery deadline for the first packet and may determine the second priority based on a second delivery deadline for the second packet.

At 1034, the first UE may determine to drop the first packet when the first priority is less than the second priority or to drop the second packet when the second priority is less than the first priority, as described above in connection with, for example, 950 of FIG. 9. For example, the priority handling component 1110 of the apparatus 1102 in FIG. 11 may be configured to determine to drop the first packet when the first priority is less than the second priority or to drop the second packet when the second priority is less than the first priority. In some examples when the first UE determines the priorities of the first packet and the second packet based on the reception time of the respective packet, the first UE may determine to drop the newest received packet (e.g., the second packet) or to drop the oldest received packet (e.g., the first packet). In some examples when the first UE determines the priorities of the first packet and the second packet based on the delivery deadline of the respective packet, the first UE may determine to drop the packet that is the first to expire or to drop the packet that is the last to expire.

In some examples, the first UE may determine to drop the first packet or the second packet based on at least the indication. For example, at 1036, the first UE may receive an indication to drop the first packet or the second packet, as described above in connection with, for example, the packet dropping indication 940 of FIG. 9. For example, an indication handling component 1112 of the apparatus 1102 in FIG. 11 may be configured to receive the indication to drop the first packet or the second packet. In some examples, the first UE may receive the indication in DCI from a base station. In some such examples, the DCI may include a group identifier.

At 1038, the first UE may determine to drop the first packet or the second packet based on the indication, as described above in connection with, for example, 950 of FIG. 9. For example, the indication handling component 1112 of the apparatus 1102 in FIG. 11 may be configured to determine to drop the first packet or the second packet based on the indication. In some examples, the first UE may determine to drop the first packet or the second packet based on the first packet or the second packet being associated with the group identifier (received at 1036).

Figure 11:
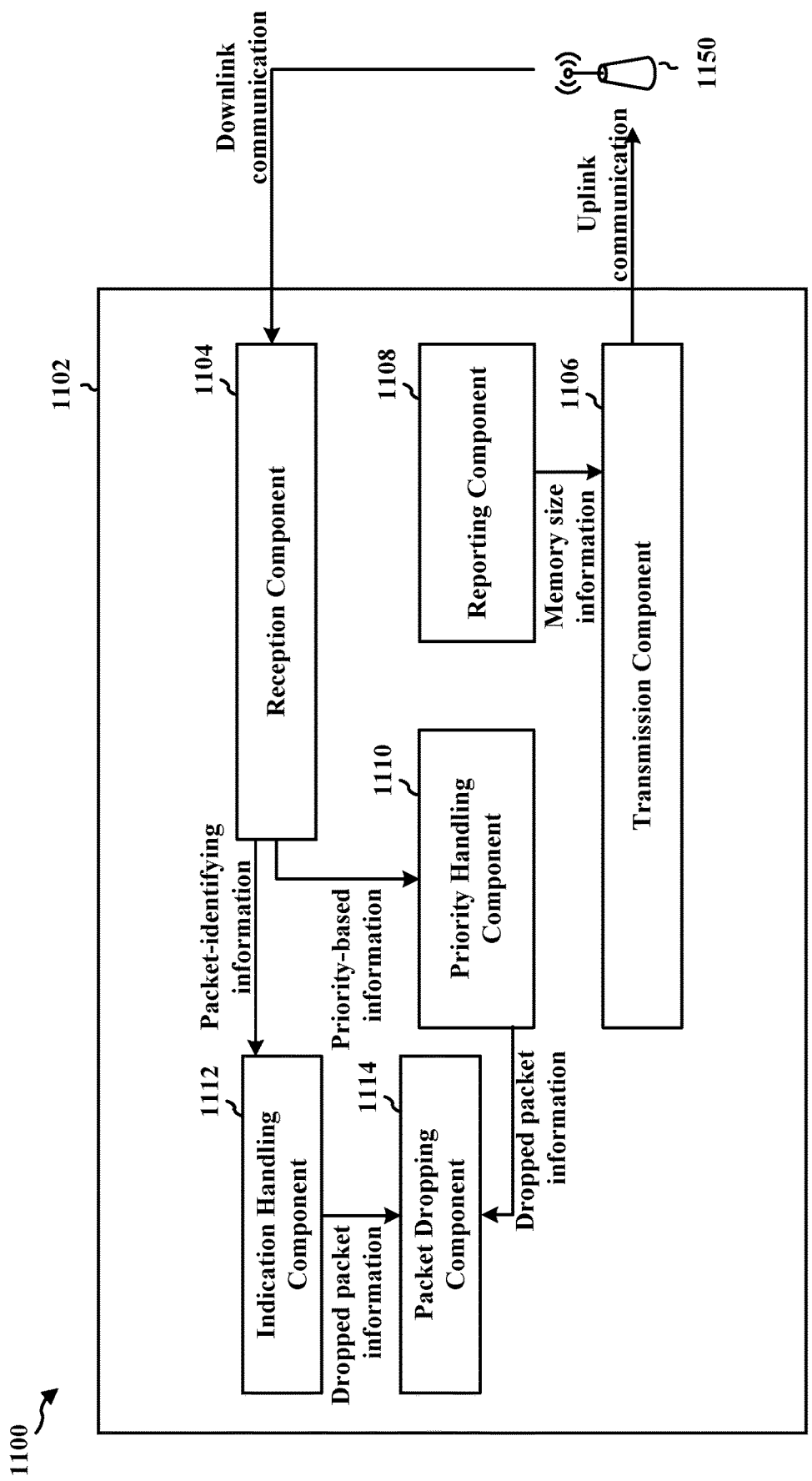
FIG. 11 is a conceptual data flow diagram illustrating the data flow between different means/components in an example apparatus.

FIG. 11 is a conceptual data flow diagram 1100 illustrating the data flow between different means/components in an example apparatus 1102 in communication with a wireless device 1150. The apparatus may be a UE or a component of a UE. The apparatus includes a reception component 1104, a transmission component 1106, a reporting component 1108, a priority handling component 1110, an indication handling component 1112, and a packet dropping component 1114. The wireless device 1150 may include the same or similar component as shown with respect to the wireless device 902 of FIG. 9.

The reception component 1104 may be configured to receive various types of signals/messages and/or other information from other devices, including, for example, the wireless device 1150. The messages/information may be received via the reception component 1104 and provided to one or more components of the apparatus 1102 for further processing and/or use in performing various operations. For example, the reception component 1104 may be configured to receive, from a wireless device, the first packet and the second packet, as described in connection with, for example, 1020 of FIG. 10.

The transmission component 1106 may be configured to transmit various types of signals/messages and/or other information to other devices, including, for example, the wireless device 1150.

The reporting component 1108 may be configured to report, to a wireless device (e.g., the wireless device 1150), the memory size of the first UE for retransmission storage, as described in connection with, for example, 1010 of FIG. 10.

The priority handling component 1110 may be configured to receive the first priority of the first packet and the second priority of the second packet and/or to determine to drop the first packet when the first priority is less than the second priority or to drop the second packet when the second priority is less than the first priority, as described in connection with, for example, 1032 and 1034 of FIG. 10.

The indication handling component 1112 may be configured to receive the indication to drop the first packet or the second packet and/or to determine to drop the first packet or the second packet based on the indication, as described in connection with, for example, 1036 and 1038 of FIG. 10.

The packet dropping component 1114 may be configured to determine to drop the first packet or the second packet based on at least one of the packet priority or the indication from the wireless device and/or to drop the first packet or the second packet prior to retransmission, as described in connection with, for example, 1030 and 1040 of FIG. 10.

The apparatus may include additional components that perform each of the blocks of the algorithm in the aforementioned flowchart of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
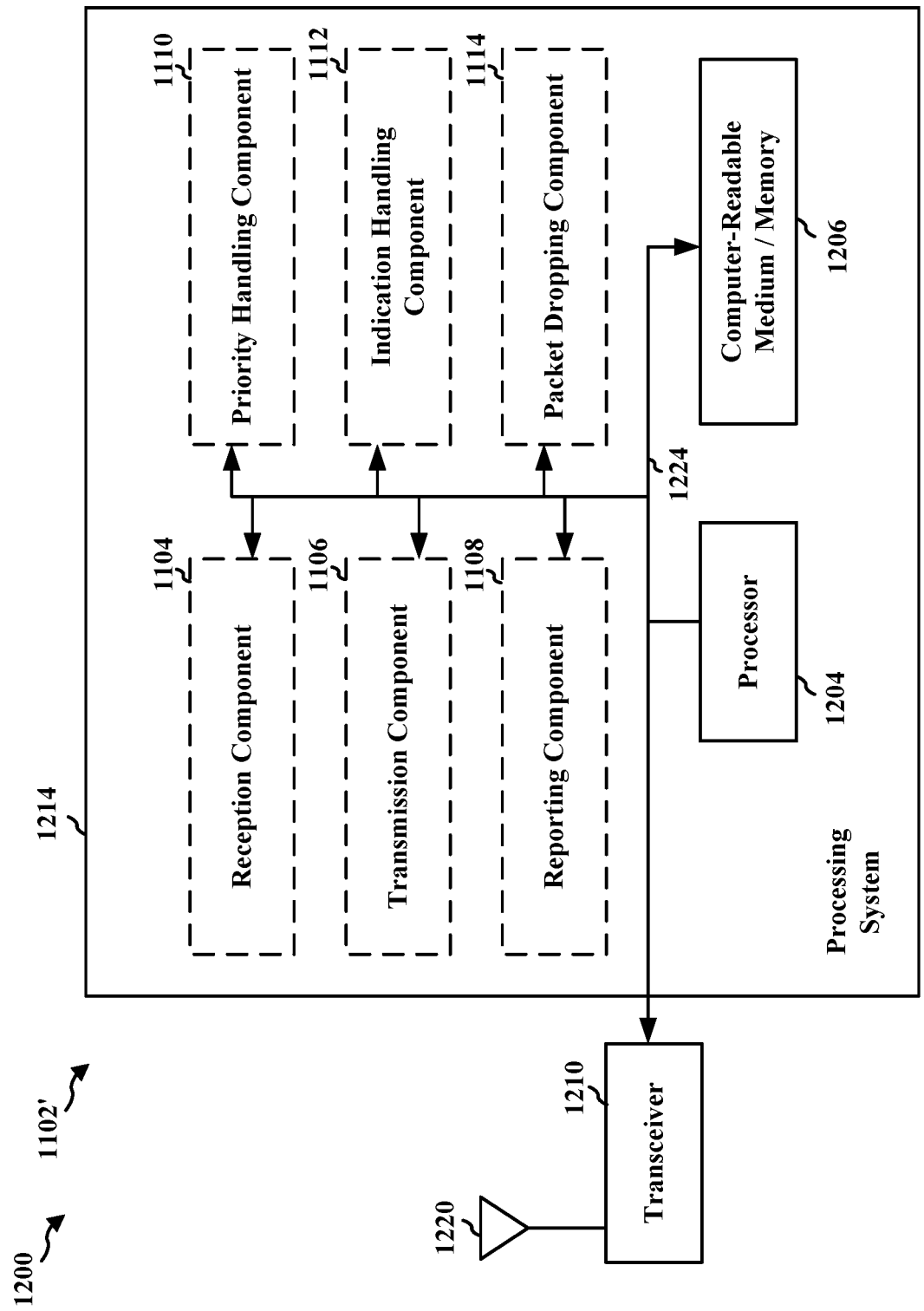
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114. The components may be software components running in the processor 1204, resident/stored in the computer readable medium/memory 1206, one or more hardware components coupled to the processor 1204, or some combination thereof. The processing system 1214 may be a component of the UE (e.g., the device 350) and may include the memory 360 and/or at least one of the TX processor 368, the RX processor 356, and the controller/processor 359. Alternatively, the processing system 1214 may be the entire UE (e.g., see the device 350 of FIG. 3).

In one configuration, the apparatus 1102/1102' for wireless communication includes means for receiving, from a wireless device, a first packet and a second packet for sidelink retransmission to at least one second UE, the second packet being received after the first packet. The apparatus 1102/1102' may also include means for dropping the first packet or the second packet prior to retransmission based on at least one of a packet priority or an indication from the wireless device. The apparatus 1102/1102' may also include means for dropping the first packet or the second packet based on a storage capacity of the first UE. The apparatus 1102/1102' may also include means for receiving the first priority and the second priority in group information from a base station. The apparatus 1102/1102' may also include means for receiving, from a base station, an indication to drop the first packet or the second packet, and where the first UE drops the first packet or the second packet based on the indication. The apparatus 1102/1102' may also include means for reporting to a base station a memory size of the first UE for retransmission storage, and where the second packet is received based on the memory size.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 13:
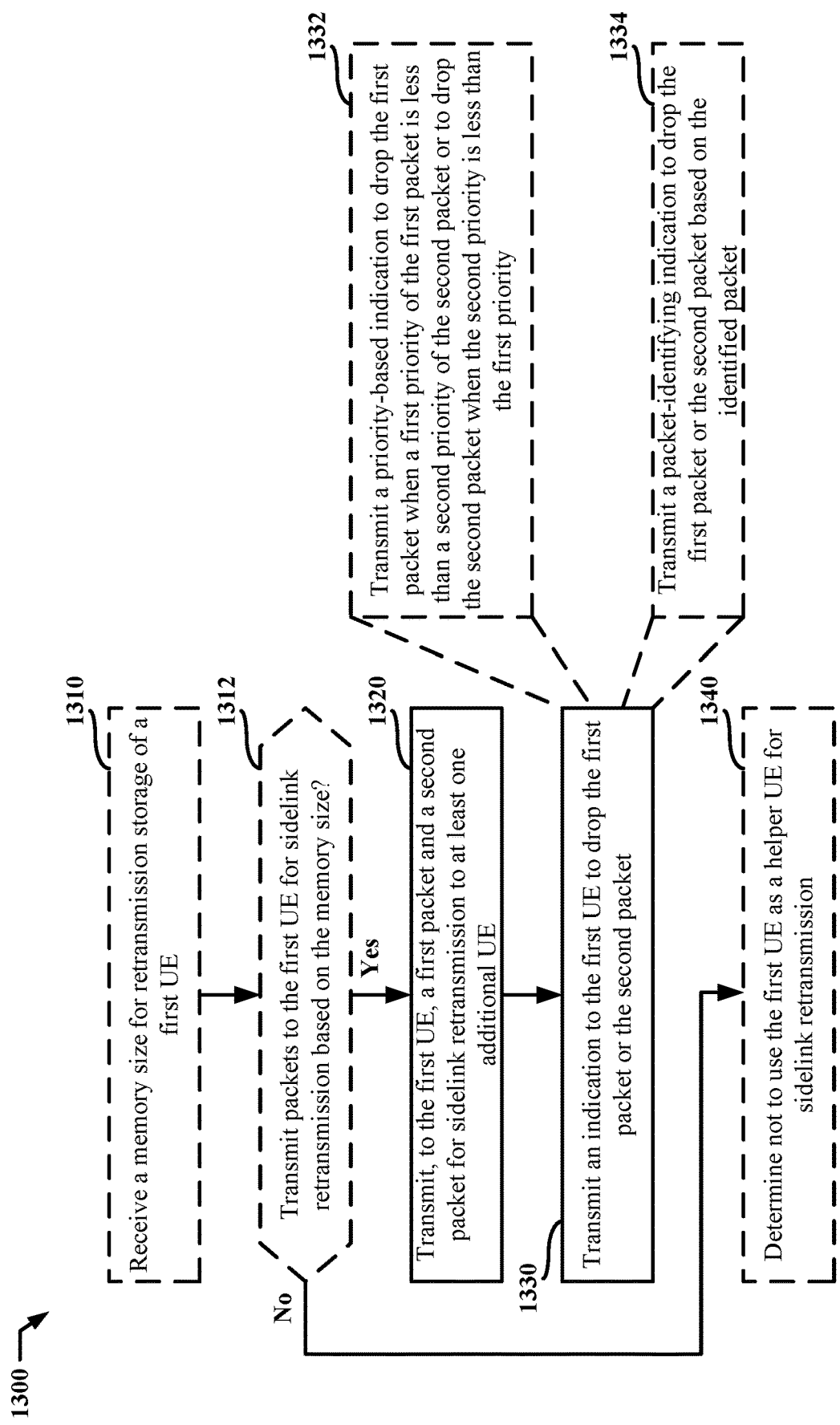
FIG. 13 is a flowchart of a method of wireless communication.

FIG. 13 is a flowchart 1300 of a method of wireless communication. The method may be performed by a wireless device (e.g., the wireless device 902 of FIG. 9), such as a base station (e.g., the base station 102/180 of FIG. 1, the base station 503 of FIG. 5, the base station 603 of FIGS. 6A and 6B, the base station 702 of FIG. 7A, and/or the base station 702a of FIG. 7A; the apparatus 1402/1402' of FIGS. 14/15; the processing system 1514, which may include the memory 376 and which may be the entire base station (e.g., device 310) or a component of the device 310, such as the TX processor 316, the RX processor 370, and/or the controller/processor 375) and/or a PLC (e.g., the PLC 145 of FIG. 1, the PLC 502 of FIG. 5, the PLC 602 of FIGS. 6A and 6B, the PLC 702b of FIG. 7B). Optional aspects are illustrated with a dashed line. The method may help improve reliability of sidelink retransmissions by employing a packet dropping policy for a first UE (e.g., a helper UE) based on memory storage capacity information associated with the first UE.

At 1320, the wireless device transmits, to a first UE, a first packet and a second packet for sidelink retransmission to at least one additional UE, as described above in connection with, for example, the first packet 930a and the second packet 930b of FIG. 9. For example, a transmission component 1406 of the apparatus 1402 in FIG. 14 may be configured to transmit the first packet and the second packet for retransmission to at least one additional UE. In some examples, the wireless device may transmit the second packet after the first packet. In some examples, the first packet and the second packet are for sidelink retransmission to different UEs. In some examples, the first packet and the second packet comprise downlink packets and/or sidelink packets.

At 1330, the wireless device transmits an indication to the first UE to drop the first packet or the second packet, as described above in connection with, for example, the packet dropping indication 940 of FIG. 9. For example, the transmission component 1406 of the apparatus 1402 in FIG. 14 may be configured to transmit the indication to the first UE to drop the first packet or the second packet. In some examples, the indication to drop the first packet or the second packet may be based on a memory storage capacity of the first UE.

In some examples, the indication to the first UE may be a priority-based indication. For example, at 1332, the wireless device may transmit a priority-based indication to drop the first packet when a first priority of the first packet is less than a second priority of the second packet or to drop the second packet when the second priority is less than the first priority, as described above in connection with, for example, the packet dropping indication 940 of FIG. 9. For example, a priority handling component 1408 of the apparatus 1402 in FIG. 14 may be configured to transmit the priority-based indication to the first UE.

In some examples, the wireless device may transmit the respective priorities to the first UE. For example, the wireless device may transmit the first priority and the second priority in group information to the first UE. In some such examples, the group information may comprise an SPS configuration. In some examples, the wireless device may transmit the first priority in a first payload of the first packet and the second priority in a second payload of the second packet. In some such examples, the first packet and the second packet may be transmitted in SPS transmissions.

In some examples, the priority-based indication may cause the first UE to determine the respective priorities of the first packet and the second packet based on reception times for the respective priorities. For example, the priority-based indication may cause the first UE to determine the first priority based on a first reception time for the first packet and to determine the second priority based on a second reception time for the second packet. In some such examples, the first UE may determine to drop the newest received packet (e.g., the second packet) or to drop the oldest received packet (e.g., the first packet).

In some examples, the priority-based indication may cause the first UE to determine the first priority based on a first delivery deadline for the first packet and to determine the second priority based on a second delivery deadline for the second packet. In some such examples, the first UE may determine to drop the packet that is the first to expire or to drop the packet that is the last to expire.

In some examples, the indication to the first UE may be a packet-identifying indication. For example, at 1334, the wireless device may transmit a packet-identifying indication to drop the first packet or the second packet based on the identified packet, as described above in connection with, for example, the packet dropping indication 940 of FIG. 9. For example, a packet-identifying component 1410 of the apparatus 1402 in FIG. 14 may be configured to transmit the packet-identifying indication to the first UE. In some examples, the packet-identifying indication may be transmitted in DCI to the first UE. In some such examples, the DCI may include a group identifier that identifies the packet to be dropped.

In some examples, the wireless device may determine whether to use the first UE as a helper UE for sidelink retransmission based on memory size information provided by the first UE. For example, at 1310, the wireless device may receive a memory size for retransmission storage from the first UE, as described above in connection with, for example, the storage capacity information message 910 of FIG. 9. For example, a memory size handling component 1412 of the apparatus 1402 in FIG. 14 may be configured to receive the memory size for retransmission storage from the first UE. In some examples, the wireless device may receive the memory size in a UE capability information message from the first UE.

At 1312, the wireless device may determine whether to transmit packets to the first UE for sidelink retransmission based on the memory size, as described above in connection with, for example, 920 of FIG. 9. For example, the memory size handling component 1412 of the apparatus 1402 in FIG. 14 may be configured to determine whether to transmit packets to the first UE for sidelink transmission based on the memory size. In some examples, the wireless device may compare the received memory size to a sidelink retransmission storage capacity threshold to determine whether to use the first UE as a helper UE and to transmit packets to the first UE for sidelink retransmission.

If, at 1312, the wireless device determines not to transmit packets to the first UE for sidelink retransmissions (e.g., the received memory size is less than the sidelink retransmission storage capacity threshold), then, at 1340, the wireless device may determine not to use the first UE as a helper UE for sidelink retransmission, as described above in connection with, for example, 920 of FIG. 9. For example, the memory size handling component 1412 of the apparatus 1402 in FIG. 14 may be configured to determine not to use the first UE as a helper UE for sidelink retransmission when the received memory size is less than the sidelink retransmission storage capacity threshold.

If, at 1312, the wireless determines to transmit packets to the first UE for sidelink retransmissions (e.g., the received memory size is greater than or equal to the sidelink retransmission storage capacity threshold), then the UE may proceed to 1320 to transmit the first packet and the second packet for sidelink retransmission to at least one additional UE, as described above.

Figure 14:
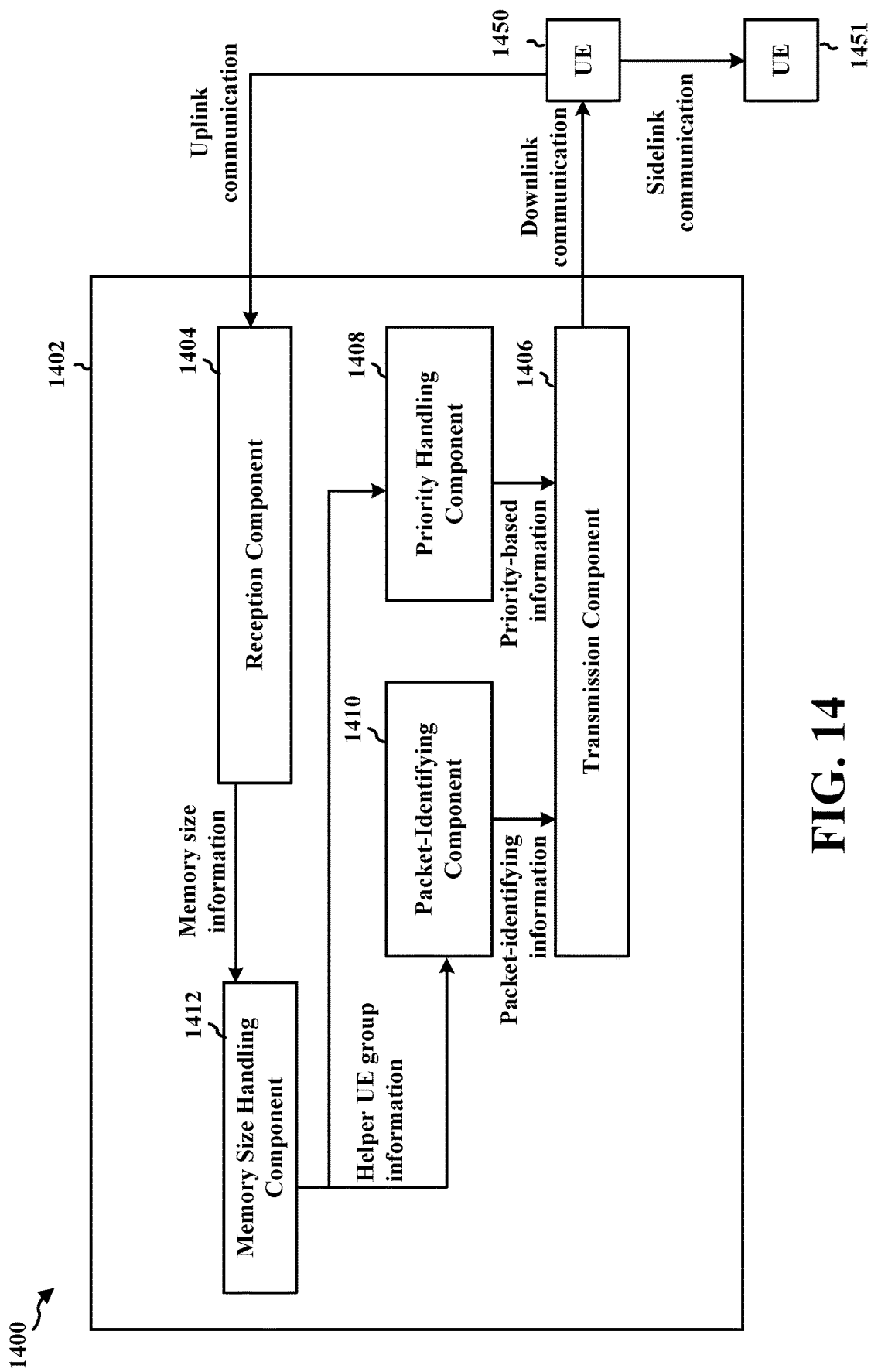
FIG. 14 is a conceptual data flow diagram illustrating the data flow between different means/components in an example apparatus.

FIG. 14 is a conceptual data flow diagram 1400 illustrating the data flow between different means/components in an example apparatus 1402 in communication with a UE 1450. The apparatus may be a wireless device, such as a base station or a PLC, or a component of the wireless device. The apparatus includes a reception component 1404, a transmission component 1406, a priority handling component 1408, a packet-identifying component 1410, and a memory size handling component 1412. The UE 1450 may include the same or similar component as shown with respect to the UE 904 of FIG. 9.

The reception component 1404 may be configured to receive various types of signals/messages and/or other information from other devices, including, for example, uplink transmissions from the UE 1450. The messages/information may be received via the reception component 1404 and provided to one or more components of the apparatus 1402 for further processing and/or use in performing various operations. The transmissions from the UE 1450 may originate at another UE 1451 that are provided to the UE 1450 via sidelink.

The transmission component 1406 may be configured to transmit various types of signals/messages and/or other information to other devices, including, for example, downlink transmissions to the UE 1450. For example, the transmission component 1406 may be configured to transmit the first packet and the second packet for retransmission to at least one additional UE and/or to transmit the indication to the first UE to drop the first packet or the second packet, as described in connection with, for example, 1320 and 1330 of FIG. 13. The downlink transmissions may be intended for reception by another UE 1451, and the UE 1450 may receive the downlink transmissions and provide them to the UE 1451 via sidelink.

The priority handling component 1408 may be configured to transmit the priority-based indication to the first UE, as described in connection with, for example, 1332 of FIG. 13.

The packet-identifying component 1410 may be configured to transmit the packet-identifying indication to the first UE, as described in connection with, for example, 1334 of FIG. 13.

The memory size handling component 1412 may be configured to receive the memory size for retransmission storage from the first UE, to determine whether to transmit packets to the first UE for sidelink transmission based on the memory size, and/or to determine not to sue the first UE as a helper UE for sidelink retransmission when the received memory size is less than the sidelink retransmission storage capacity threshold, as described in connection with, for example, 1310, 1312, and/or 1340 of FIG. 13.

The apparatus may include additional components that perform each of the blocks of the algorithm in the aforementioned flowchart of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
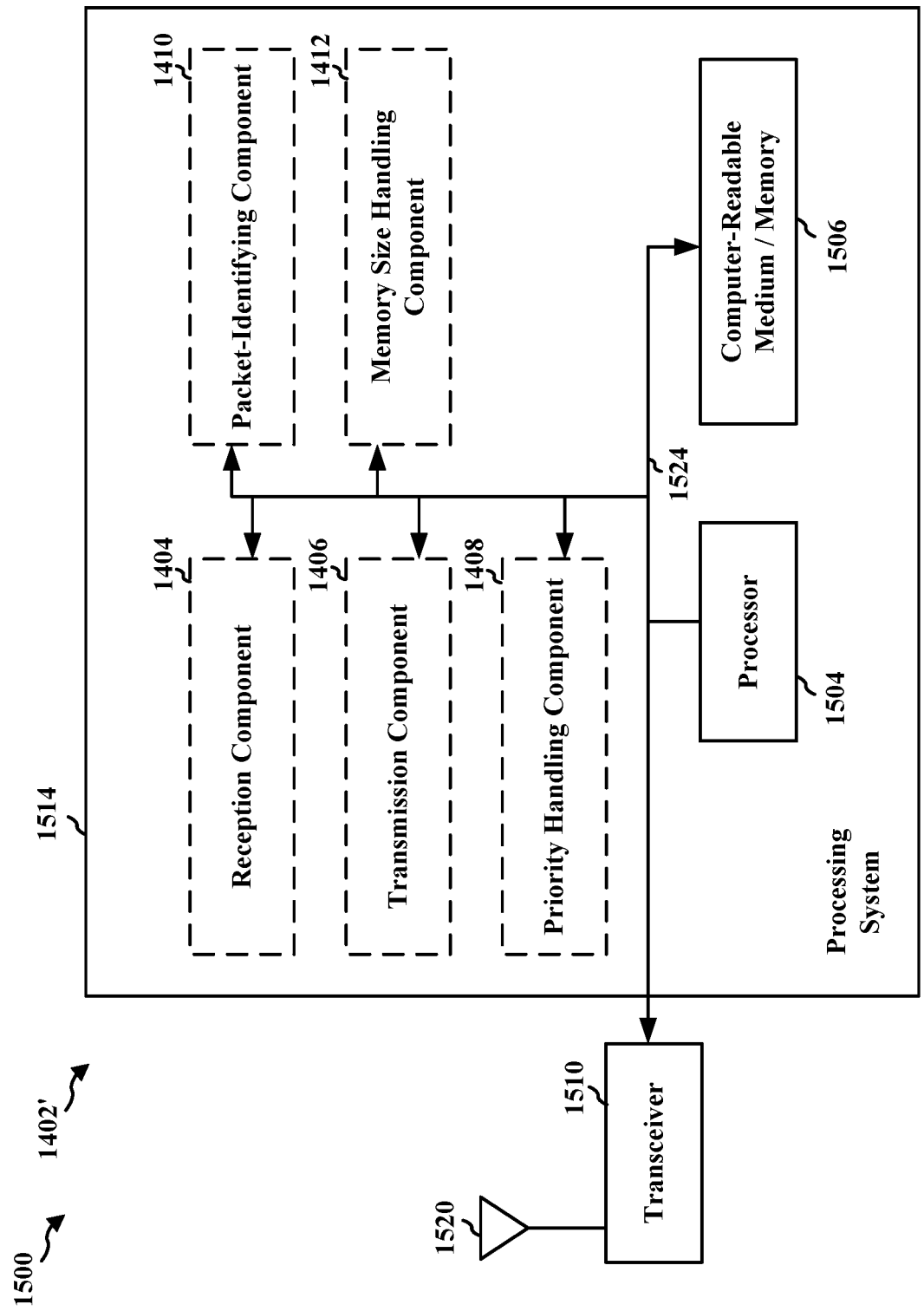
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the base station (e.g., the device 310) and may include the memory 376 and/or at least one of the TX processor 316, the RX processor 370, and the controller/processor 375. Alternatively, the processing system 1514 may be the entire base station (e.g., see the device 310 of FIG. 3).

In one configuration, the apparatus 1402/1402' for wireless communication includes means for transmitting, to a first user equipment (UE), a first packet and a second packet for sidelink retransmission to at least one additional UE, the second packet being transmitted after the first packet. The apparatus 1402/1402' may also include means for transmitting an indication to the first UE to drop the first packet or the second packet. The apparatus 1402/1402' may also include means for transmitting the first priority and the second priority in group information to the first UE. The apparatus 1402/1402' may also include means for receiving, from the first UE, a memory size for retransmission storage of the first UE. The apparatus 1402/1402' may also include means for determining whether to transmit packets to the first UE for sidelink retransmission based on the memory size.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a first UE comprising: receiving, from a wireless device, a first packet and a second packet for sidelink retransmission to at least one second UE, the second packet being received after the first packet; and dropping the first packet or the second packet prior to retransmission based on at least one of a packet priority or an indication from the wireless device.

In Example 2, the method of Example 1 further includes that the first packet and the second packet comprise downlink packets received from a base station.

In Example 3, the method of Example 1 or Example 2 further includes that the first packet and the second packet comprise downlink packets or sidelink packets received from a PLC.

In Example 4, the method of any of Examples 1 to 3 further includes that the dropping of the first packet or the second packet occurs based on a storage capacity of the first UE.

In Example 5, the method of any of Examples 1 to 4 further includes that the first packet and the second packet are for sidelink retransmission to different UEs.

In Example 6, the method of any of Examples 1 to 5 further includes that the first packet is dropped when a first priority of the first packet is less than a second priority of the second packet, or the second packet is dropped when the second priority is less than the first priority.

In Example 7, the method of any of Examples 1 to 6 further includes receiving the first priority and the second priority in group information from a base station.

In Example 8, the method of any of Examples 1 to 7 further includes that the group information comprises a SPS configuration.

In Example 9, the method of any of Examples 1 to 8 further includes that the first priority is included in a first payload of the first packet and the second priority is included in a second payload of the second packet.

In Example 10, the method of any of Examples 1 to 9 further includes that the first packet and the second packet are received in SPS transmissions.

In Example 11, the method of any of Examples 1 to 10 further includes that the first priority comprises a first reception time for the first packet and the second priority comprises a second reception time for the second packet.

In Example 12, the method of any of Examples 1 to 11 further includes that the first priority comprises a first delivery deadline for the first packet and the second priority comprises a second delivery deadline for the second packet.

In Example 13, the method of any of Examples 1 to 12 further includes receiving, from a base station, an indication to drop the first packet or the second packet, wherein the first UE drops the first packet or the second packet based on the indication.

In Example 14, the method of any of Examples 1 to 13 further includes that the indication is received in DCI including a group identifier, and wherein the first UE drops the first packet or the second packet based on the first packet or the second packet being associated with the group identifier In Example 15, the method of any of Examples 1 to 14 further includes reporting to a base station a memory size of the first UE for retransmission storage, wherein the second packet is received based on the memory size.

In Example 16, the method of any of Examples 1 to 15 further includes that the memory size is reported in a UE capability information message to the base station.

Example 17 is a device including one or more processors and one or more memories in electronic communication with the one or more processors storing instructions executable by the one or more processors to cause a system or an apparatus to implement a method as in any of Examples 1 to 16.

Example 18 is a system or apparatus including means for implementing a method or realizing an apparatus as in any of Examples 1 to 16.

Example 19 is a non-transitory computer-readable medium storing instructions executable by one or more processors to cause the one or more processors to implement a method as in any of Examples 1 to 16.

Example 20 is a method of wireless communication at a wireless device comprising a base station or a PLC, the method comprising: transmitting, to a first UE, a first packet and a second packet for sidelink retransmission to at least one additional UE, the second packet being transmitted after the first packet; and transmitting an indication to the first UE to drop the first packet or the second packet In Example 21, the method of Example 20 further includes that the indication to drop the first packet or the second packet is based on a storage capacity of the first UE.

In Example 22, the method of any of Example 20 or Example 21 further includes that the first packet and the second packet are for sidelink retransmission to different UEs.

In Example 23, the method of any of Examples 20 to 22 further includes that the indication comprises a priority-based indication, and wherein the first packet is indicated to be dropped when a first priority of the first packet is less than a second priority of the second packet, or the second packet is indicated to be dropped when the second priority is less than the first priority.

In Example 24, the method of any of Examples 20 to 23 further includes transmitting the first priority and the second priority in group information to the first UE.

In Example 25, the method of any of Examples 20 to 24 further includes that the group information comprises a SPS configuration.

In Example 26, the method of any of Examples 20 to 25 further includes that the first priority is included in a first payload of the first packet and the second priority is included in a second payload of the second packet.

In Example 27, the method of any of Examples 20 to 26 further includes that the first packet and the second packet are transmitted in SPS transmissions.

In Example 28, the method of any of Examples 20 to 27 further includes that the first priority comprises a first reception time for the first packet and the second priority comprises a second reception time for the second packet, wherein the first packet is indicated to be dropped when the first reception time is less than the second reception time.

In Example 29, the method of any of Examples 20 to 28 further includes that the first priority is based on a first delivery deadline for the first packet and the second priority comprises a second delivery deadline for the second packet.

In Example 30, the method of any of Examples 20 to 29 further includes that the indication identifies a packet to be dropped.

In Example 31, the method of any of Examples 20 to 30 further includes that the indication comprises a group identifier transmitted in DCI that identifies the packet to be dropped.

In Example 32, the method of any of Examples 20 to 31 further includes:
receiving, from the first UE, a memory size for retransmission storage of the first UE; and determining whether to transmit packets to the first UE for sidelink retransmission based on the memory size.

In Example 33, the method of any of Examples 20 to 32 further includes that the memory size is received in a UE capability information message from the first UE.

Example 34 is a device including one or more processors and one or more memories in electronic communication with the one or more processors storing instructions executable by the one or more processors to cause a system or an apparatus to implement a method as in any of Examples 20 to 33.

Example 35 is a system or apparatus including means for implementing a method or realizing an apparatus as in any of Examples 20 to 33.

Example 36 is a non-transitory computer-readable medium storing instructions executable by one or more processors to cause the one or more processors to implement a method as in any of Examples 20 to 33.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
   receiving, from a wireless device, a first transport block and a second transport block for sidelink retransmission to at least one second UE, the second transport block being received after the first transport block, the at least one second UE being different than the wireless device;
   receiving a first priority and a second priority in group information from a base station;
   dropping the first transport block or the second transport block prior to retransmission to the at least one second UE based on at least one of a transport block priority or an indication from the wireless device, wherein the first transport block is dropped when the first priority of the first transport block is less than the second priority of the second transport block, or the second transport block is dropped when the second priority is less than the first priority; and
   retransmitting, from the first UE to the at least one second UE, a remaining transport block that is not dropped from the first transport block and the second transport block received from the wireless device.

2. The method of claim 1, wherein the first transport block and the second transport block comprise downlink transport blocks received from a base station.

3. The method of claim 1, wherein the first transport block and the second transport block comprise downlink transport blocks or sidelink transport blocks from a programmable logic controller (PLC).

4. The method of claim 1, wherein dropping of the first transport block or the second transport block occurs based on a memory storage capacity of the first UE.

5. The method of claim 1, wherein the first transport block and the second transport block are for the sidelink retransmission to different UEs.

6. The method of claim 1, wherein the group information comprises a semi-persistently scheduled (SPS) configuration.

7. The method of claim 1, wherein the first priority is included in a first payload of the first transport block and the second priority is included in a second payload of the second transport block.

8. The method of claim 7, wherein the first transport block and the second transport block are received in semi-persistently scheduled (SPS) transmissions.

9. The method of claim 1, wherein the first priority comprises a first reception time for the first transport block and the second priority comprises a second reception time for the second transport block or the first priority comprises a first delivery deadline for the first transport block and the second priority comprises a second delivery deadline for the second transport block.

10. The method of claim 1, further comprising receiving, from a base station, the indication to drop the first transport block or the second transport block, wherein the first UE drops the first transport block or the second transport block based on the indication.

11. The method of claim 10, wherein the indication is received in downlink control information (DCI) including a group identifier, and wherein the first UE drops the first transport block or the second transport block based on the first transport block or the second transport block being associated with the group identifier.

12. The method of claim 1, further comprising reporting to a base station a memory size of the first UE for retransmission storage, wherein the second transport block is received based on the memory size, wherein the memory size is reported in a UE capability information message to the base station.

13. An apparatus for wireless communication at a first user equipment (UE), comprising:
a memory; and
at least one processor coupled to the memory and configured to:
receive, from a wireless device, a first transport block and a second transport block for sidelink retransmission to at least one second UE, the second transport block being received after the first transport block, the at least one second UE being different than the wireless device;
receive a first priority and a second priority in group information from a base station;
drop the first transport block or the second transport block prior to retransmission to the at least one second UE based on at least one of a transport block priority or an indication from the wireless device, wherein the first transport block is dropped when the first priority of the first transport block is less than the second priority of the second transport block, or the second transport block is dropped when the second priority is less than the first priority; and
retransmit, from the first UE to the at least one second UE, a remaining transport block that is not dropped from the first transport block and the second transport block received from the wireless device.

14. A method of wireless communication at a wireless device comprising a base station or a programmable logic controller (PLC), the method comprising:

transmitting, to a first user equipment (UE), a first transport block and a second transport block for sidelink retransmission to at least one additional UE, the second transport block being transmitted after the first transport block, the at least one additional UE being different than the first UE;
transmitting a first priority and a second priority in group information to the first UE; and
transmitting an indication to the first UE to drop the first transport block or the second transport block from the sidelink retransmission to the at least one additional UE, wherein the indication comprises a priority based indication, and wherein the first transport block is indicated to be dropped when the first priority of the first transport block is less than the second priority of the second transport block, or the second transport block is indicated to be dropped when the second priority is less than the first priority.

15. The method of claim 14, wherein the indication to drop the first transport block or the second transport block is based on a memory storage capacity of the first UE.

16. The method of claim 14, wherein the first transport block and the second transport block are for the sidelink retransmission to different UEs.

17. The method of claim 14, wherein the group information comprises a semi-persistently scheduled (SPS) configuration.

18. The method of claim 14, wherein the first priority is included in a first payload of the first transport block and the second priority is included in a second payload of the second transport block.

19. The method of claim 18, wherein the first transport block and the second transport block are transmitted in semi-persistently scheduled (SPS) transmissions.

20. The method of claim 14, wherein the first priority comprises a first reception time for the first transport block and the second priority comprises a second reception time for the second transport block, and wherein the first transport block is indicated to be dropped when the first reception time is less than the second reception time.

21. The method of claim 14, wherein the first priority is based on a first delivery deadline for the first transport block and the second priority comprises a second delivery deadline for the second transport block.

22. The method of claim 14, wherein the indication identifies a transport block to be dropped.

23. The method of claim 22, wherein the indication comprises a group identifier transmitted in downlink control information (DCI) that identifies the transport block to be dropped.

24. The method of claim 14, further comprising:
receiving from the first UE a memory size for retransmission storage; and
determining whether to transmit transport blocks to the first UE for the sidelink retransmission based on the memory size.

25. The method of claim 24, wherein the memory size is received in a UE capability information message from the first UE.

26. An apparatus for wireless communication at a wireless device comprising a base station or a programmable logic controller (PLC), comprising:
a memory; and
at least one processor coupled to the memory and configured to:
transmit, to a first user equipment (UE), a first transport block and a second transport block for sidelink retransmission to at least one additional UE, the second transport block being transmitted after the first transport block, the at least one additional UE being different than the first UE;

transmit a first priority and a second priority in group information to the first UE; and transmit an indication to the first UE to drop the first transport block or the second transport block from the sidelink retransmission to the at least one additional UE, wherein the indication comprises a priority based indication, and wherein the first transport block is indicated to be dropped when the first priority of the first transport block is less than the second priority of the second transport block, or the second transport block is indicated to be dropped when the second priority is less than the first priority.

* * * * *